US009470950B2

(12) United States Patent
Paolini, Jr. et al.

(10) Patent No.: US 9,470,950 B2
(45) Date of Patent: *Oct. 18, 2016

(54) ELECTRO-OPTIC DISPLAYS, AND PROCESSES FOR THE PRODUCTION THEREOF

(71) Applicant: E INK CORPORATION, Cambridge, MA (US)

(72) Inventors: Richard J. Paolini, Jr., Framingham, MA (US); Thomas Henry Whitesides, Victoria (CA)

(73) Assignee: E Ink Corporation, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/934,872

(22) Filed: Nov. 6, 2015

(65) Prior Publication Data

US 2016/0062206 A1 Mar. 3, 2016

Related U.S. Application Data

(60) Continuation-in-part of application No. 13/751,354, filed on Jan. 28, 2013, now Pat. No. 9,182,646, which is a division of application No. 12/873,416, filed on Sep. 1, 2010, now Pat. No. 8,363,299, which is a (Continued)

(51) Int. Cl.
*G02F 1/03* (2006.01)
*G02B 26/00* (2006.01)
(Continued)

(52) U.S. Cl.
CPC ............. *G02F 1/167* (2013.01); *B29C 65/02* (2013.01); *B29C 66/45* (2013.01); *B29C 66/71* (2013.01);
(Continued)

(58) Field of Classification Search
CPC ............ G02F 1/0123; G02F 1/167; G02F 2001/1678; G02F 1/172; G02F 2001/1672; G02F 1/07; G02B 26/026; G02B 26/001

USPC ........ 359/296, 265–277, 245–247, 254, 242; 430/31–32; 345/107, 49, 105; 438/929; 349/33

See application file for complete search history.

(56) References Cited

U.S. PATENT DOCUMENTS 3,756,693 A 9/1973 Ota
3,767,392 A 10/1973 Ota
(Continued)

FOREIGN PATENT DOCUMENTS

CN 1296194 A 5/2001
JP 62269124 A 11/1987
(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Dawayne A Pinkney
(74) *Attorney, Agent, or Firm* — David J. Cole

(57) ABSTRACT

An assembly useful for producing an encapsulated electrophoretic display is prepared from an electrophoretic medium comprising a plurality of discrete droplets (904) in a polymeric binder (906), each droplet comprising a plurality of charged particles dispersed in a fluid, and a front sub-assembly comprising a light-transmissive electrically-conductive layer (902) and a color filter array (920). The electrophoretic medium is laminated to the front-assembly (902, 920) at a temperature at which the polymeric binder (906) will flow and secure the electrophoretic medium to the front sub-assembly to form the final assembly, with the light-transmissive electrically-conductive layer (902) disposed between the color filter array (920) and the electrophoretic medium (904, 906).

14 Claims, 10 Drawing Sheets

Related U.S. Application Data continuation-in-part of application No. 12/326,402, filed on Dec. 2, 2008, now Pat. No. 7,791,782, which is a continuation of application No. 11/307,297, filed on Jan. 31, 2006, now Pat. No. 7,513,813, which is a division of application No. 10/904,063, filed on Oct. 21, 2004, now Pat. No. 7,110,164, which is a continuation-in-part of application No. 10/249,957, filed on May 22, 2003, now Pat. No. 6,982,178, said application No. 10/904,063 is a continuation-in-part of application No. 10/605,024, filed on Sep. 2, 2003, now Pat. No. 7,561,324.

(60) Provisional application No. 60/320,186, filed on May 12, 2003, provisional application No. 60/319,300, filed on Jun. 10, 2002, provisional application No. 60/319,516, filed on Sep. 3, 2002, provisional application No. 60/481,553, filed on Oct. 24, 2003, provisional application No. 60/481,554, filed on Oct. 24, 2003, provisional application No. 60/481,564, filed on Oct. 27, 2003, provisional application No. 60/520,226, filed on Nov. 14, 2003.

(51) Int. Cl.

| | | |
|---|---|---|
| *G03G 17/04* | (2006.01) | |
| *G09G 3/34* | (2006.01) | |
| *G02F 1/167* | (2006.01) | |
| *B32B 37/04* | (2006.01) | |
| *B32B 38/10* | (2006.01) | |
| *B32B 37/16* | (2006.01) | |
| *B32B 37/26* | (2006.01) | |
| *B29C 65/02* | (2006.01) | |
| *B29C 65/00* | (2006.01) | |
| *G02F 1/01* | (2006.01) | |
| *B32B 37/00* | (2006.01) | |
| *B29L 31/34* | (2006.01) | |
| *B29K 675/00* | (2006.01) | |
| *G02F 1/15* | (2006.01) | |
| *G02F 1/17* | (2006.01) | |

(52) U.S. Cl.
CPC ........... *B29C 66/7314* (2013.01); *B32B 37/04* (2013.01); *B32B 37/16* (2013.01); *B32B 37/26* (2013.01); *B32B 38/10* (2013.01); *G02F 1/01* (2013.01); *B29K 2675/00* (2013.01); *B29L 2031/3475* (2013.01); *B32B 2037/0092* (2013.01); *B32B 2375/00* (2013.01); *B32B 2457/20* (2013.01); *G02F 1/1508* (2013.01); *G02F 1/172* (2013.01); *G02F 2001/1672* (2013.01); *G02F 2001/1678* (2013.01); *G02F 2202/022* (2013.01)

(56) References Cited

U.S. PATENT DOCUMENTS

| | | |
|---|---|---|
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris |
| 4,093,534 A | 6/1978 | Carter et al. |
| 4,121,202 A | 10/1978 | Gissane |
| 4,160,257 A | 7/1979 | Carrish |
| 4,230,405 A | 10/1980 | Kurtz |
| 4,272,596 A | 6/1981 | Harbour et al. |
| 4,418,346 A | 11/1983 | Batchelder |
| 4,522,472 A | 6/1985 | Liebert et al. |
| 4,550,982 A | 11/1985 | Hirai |
| 4,602,263 A | 7/1986 | Borror et al. |
| 4,655,897 A | 4/1987 | DiSanto et al. |
| 4,703,573 A | 11/1987 | Montgomery et al. |
| 4,742,345 A | 5/1988 | Di Santo et al. |
| 4,746,917 A | 5/1988 | Di Santo et al. |
| 4,902,108 A | 2/1990 | Byker |
| 5,250,938 A | 10/1993 | Di Santo et al. |
| 5,276,438 A | 1/1994 | DiSanto et al. |
| 5,288,433 A | 2/1994 | Stevens |
| 5,293,528 A | 3/1994 | DiSanto et al. |
| 5,319,491 A | 6/1994 | Selbrede |
| 5,378,404 A | 1/1995 | Han et al. |
| 5,402,145 A | 3/1995 | DiSanto et al. |
| 5,412,398 A | 5/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,548,282 A | 8/1996 | Escritt et al. |
| 5,582,700 A | 12/1996 | Bryning et al. |
| 5,706,109 A | 1/1998 | Yamada et al. |
| 5,728,251 A | 3/1998 | Check, III |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,825,526 A | 10/1998 | Bommarito et al. |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,046,716 A | 4/2000 | McKnight |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,105,290 A | 8/2000 | Coates |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,330,054 B1 | 12/2001 | Ikami |
| 6,337,761 B1 | 1/2002 | Rogers et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,400,492 B1 | 6/2002 | Morita et al. |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |

(56) References Cited

U.S. PATENT DOCUMENTS

| | | |
|---|---|---|
| 6,490,076 B2 | 12/2002 | Pepper |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson |
| 6,545,291 B1 | 4/2003 | Amundson et al. |
| 6,580,545 B2 | 6/2003 | Morrison et al. |
| 6,597,340 B1 | 7/2003 | Kawai |
| 6,639,578 B1 | 10/2003 | Comiskey et al. |
| 6,646,024 B2 | 11/2003 | Beach et al. |
| 6,652,075 B2 | 11/2003 | Jacobson |
| 6,657,772 B2 | 12/2003 | Loxley |
| 6,661,563 B2 | 12/2003 | Hayashi et al. |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Morrison et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,982,178 B2 | 1/2006 | LeCain |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman |
| 7,023,420 B2 | 4/2006 | Comiskey et al. |
| 7,030,412 B2 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,071,913 B2 | 7/2006 | Albert et al. |
| 7,110,163 B2 | 9/2006 | Webber et al. |
| 7,116,318 B2 | 10/2006 | Amundson et al. |
| 7,119,772 B2 | 10/2006 | Amundson et al. |
| 7,170,670 B2 | 1/2007 | Webber |
| 7,176,880 B2 | 2/2007 | Amundson et al. |
| 7,193,625 B2 | 3/2007 | Danner et al. |
| 7,202,847 B2 | 4/2007 | Gates |
| 7,223,672 B2 | 5/2007 | Kazlas et al. |
| 7,230,750 B2 | 6/2007 | Whitesides et al. |
| 7,236,291 B2 | 6/2007 | Kaga et al. |
| 7,256,766 B2 | 8/2007 | Albert et al. |
| 7,259,744 B2 | 8/2007 | Arango et al. |
| 7,280,094 B2 | 10/2007 | Albert |
| 7,312,916 B2 | 12/2007 | Pullen et al. |
| 7,321,459 B2 | 1/2008 | Masuda et al. |
| 7,339,715 B2 | 3/2008 | Webber et al. |
| 7,365,394 B2 | 4/2008 | Denis et al. |
| 7,365,733 B2 | 4/2008 | Duthaler et al. |
| 7,420,549 B2 | 9/2008 | Jacobson et al. |
| 7,513,813 B2 | 4/2009 | Paolini, Jr. et al. |
| 7,528,822 B2 | 5/2009 | Amundson et al. |
| 7,535,624 B2 | 5/2009 | Amundson |
| 7,561,324 B2 | 7/2009 | Duthaler et al. |
| 7,602,374 B2 | 10/2009 | Zehner et al. |
| 7,667,684 B2 | 2/2010 | Jacobson et al. |
| 7,728,811 B2 | 6/2010 | Albert et al. |
| 7,893,435 B2 | 2/2011 | Kazlas et al. |
| 8,129,655 B2 | 3/2012 | Jacobson et al. |
| 8,466,852 B2 | 6/2013 | Drzaic et al. |
| 2002/0060321 A1 | 5/2002 | Kazlas et al. |
| 2002/0090980 A1 | 7/2002 | Wilcox et al. |
| 2002/0101433 A1 | 8/2002 | McKnight |
| 2002/0113770 A1 | 8/2002 | Jacobson et al. |
| 2002/0149835 A1 | 10/2002 | Kanbe |
| 2003/0025855 A1* | 2/2003 | Holman ............ G02F 1/133305 349/86 |
| 2003/0102858 A1 | 6/2003 | Jacobson et al. |
| 2003/0214697 A1* | 11/2003 | Duthaler ................ G02F 1/167 359/296 |
| 2003/0224102 A1* | 12/2003 | Minami ................ G02F 1/167 427/58 |
| 2004/0105036 A1 | 6/2004 | Danner et al. |
| 2004/0119681 A1 | 6/2004 | Albert et al. |
| 2004/0257635 A1* | 12/2004 | Paolini, Jr. ............. G02F 1/167 359/296 |
| 2005/0012980 A1 | 1/2005 | Wilcox et al. |
| 2005/0018273 A1 | 1/2005 | Honeyman |
| 2005/0122563 A1 | 6/2005 | Honeyman et al. |

FOREIGN PATENT DOCUMENTS

| | | |
|---|---|---|
| JP | 64086116 A | 3/1989 |
| JP | 01267525 A | 10/1989 |
| JP | 02284125 A | 11/1990 |
| JP | 10149118 A | 6/1998 |
| JP | 2002365669 A | 12/2002 |
| JP | 2003270263 | 9/2003 |
| JP | 2003270673 | 9/2003 |
| WO | 8202961 | 9/1982 |
| WO | WO0005704 | 2/2000 |
| WO | WO0036560 | 6/2000 |
| WO | WO0038000 | 6/2000 |
| WO | WO0067110 | 11/2000 |
| WO | WO0107961 | 2/2001 |
| WO | WO0127690 | 4/2001 |
| WO | 0192359 | 12/2001 |
| WO | WO0201281 | 1/2002 |

OTHER PUBLICATIONS

O'Regan, B. et al., "A Low Cost, High-efficiency Solar Cell Based on Dye-sensitized colloidal TiO2 Films", Nature, vol. 353, Oct. 24, 1991, 773-740 Oct. 24, 1991.

Bach, U., et al., "Nanomaterials-Based Electrochromics for Paper-Quality Displays", Adv. Mater, 14(11), 845 (2002) Jun. 5, 2002.

Kitamura, T., et al., "Electrical toner movement for electronic paper-like display", Asia Display/IDW '01, p. 1517, Paper HCS1-1 (2001) Jan. 1, 2001.

Yamaguchi, Y., et al., "Toner display using insulative particles charged triboelectrically", Asia Display/IDW '01, p. 1729, Paper AMD4-4 (2001) Jan. 1, 2001.

Chen, Y., et al., "A Conformable Electronic Ink Display using a Foil-Based a-Si TFT Array", SID 01 Digest, 157 (Jun. 2001) Jun. 30, 2001.

(56) References Cited

OTHER PUBLICATIONS

Comiskey, B., et al., "An electrophoretic ink for all-printed reflective electronic displays", Nature, 394, 253 (1998) Dec. 31, 1998.
Comiskey, B., et al., "Electrophoretic Ink: A Printable Display Material", SID 97 Digest (1997), p. 75 Dec. 31, 1997.
Drzaic, P., et al., "A Printed and Rollable Bistable Electronic Display", SID 98 Digest (1998), p. 1131 Dec. 31, 1998.
Duthaler, G., et al., "Active-Matrix Color Displays Using Electrophoretic Ink and Color Filters", SID 02 Digest, 1374 (2002) Dec. 31, 2002.
Jacobson, J., et al., "The last book", IBM Systems J., 36, 457 (1997) Dec. 31, 1997.
Jo, G-R, et al., "Toner Display Based on Particle Movements", Chem. Mater, 14, 664 (2002) Dec. 31, 2002.
Kazlas, P., et al., "12.1" SVGA Microencapsulated Electrophoretic Active Matrix Display for Information Applicances, SID 01 Digest, 152 (Jun. 2001) Jun. 30, 2001.
Pitt, M.G., et al., "Power Consumption of Microencapsulated Electrophoretic Displays for Smart Handheld Applications", SID 02 Digest, 1378 (2002) Dec. 31, 2002.
Webber, R., "Image Stability in Active-Matrix Microencapsulated Electrophoretic Displays", SID 02 Digest, 126 (2002) Dec. 31, 2002.
Zehner, R. et al., "Drive Waveforms for Active Matrix Electrophoretic Displays", SID 03 Digest, 842 (2003) Dec. 31, 2003.
Amundson, K, et al., "12.3: Flexible, Active-Matrix Display Constructed Using a Microencapsulated Electrophoretic Material and an Organic-Semiconductor-Based Backplane", SID 01 Digest, 160 (Jun. 2001) Jun. 30, 2001.
Au, J. et al., "Ultra-Thin 3.1-in. Active-Matrix Electronic Ink Display for Mobile Devices", IDW'02, 223 (2002) Dec. 31, 2002.
Bouchard, A. et al., "High-Resolution Microencapsulated Electrophoretic Display on Silicon", SID 04 Digest, 651 (2004) Dec. 31, 2004.
Caillot, E. et al. "Active Matrix Electrophoretic Information Display for High Performance Mobile Devices", IDMC Proceedings (2003) Dec. 31, 2003.
Croucher, M.D., et al., "Electrophoretic Display: Materials as Related to Performance", Photog. Sci. Eng., 25, 80 (1981) Dec. 31, 1981.
Dalisa, A., "Electrophoretic Display Technology", Proceedings of the SID (1977) Dec. 31, 1977.
Danner, G.M. et al., "Reliability Performance for Microencapsulated Electrophoretic Displays with Simulated Active Matrix Drive", SID 03 Digest, 573 (2003) Dec. 31, 2003.
Henzen, A. et al., "An Electronic Ink Low Latency Drawing Tablet", SID 04 Digest, 1070 (2004) Dec. 31, 2004.
Henzen, A. et al., "Development of Active Matrix Electronic Ink Displays for Handheld Devices", SID 03 Digest, 176, (2003) Dec. 31, 2003.
Henzen, A. et al., "Development of Active Matrix Electronic Ink Displays for Smart Handheld Applications", IDW'02, 227 (2002) Dec. 31, 2002.
Kazlas, P. et al., "Card-size Active-matrix Electronic Ink Display", Eurodisplay 2002, 259 (2002) Dec. 31, 2002.
Ota, I., et al., "Developments in Electrophoretic Displays", Proceedings of the SID, 18, 243 (1977) Dec. 31, 1977.
Shiwa, S., et al., "Electrophoretic Display Method Using Ionographic Technology," SID 88 Digest (1988), p. 61 Dec. 31, 1988.
Whitesides, T. et al., "Towards Video-rate Microencapsulated Dual-Particle Electrophoretic Displays", SID 04 Digest, 133 (2004) Dec. 31, 2004.

\* cited by examiner

ELECTRO-OPTIC DISPLAYS, AND PROCESSES FOR THE PRODUCTION THEREOF

REFERENCE TO RELATED APPLICATIONS

This application is a continuation-in-part of application Ser. No. 13/751,354, filed Jan. 28, 2013 (Publication No. 2013/0141778, now U.S. Pat. No. 9,182,646, issued Nov. 10, 2015), which is a division of application Ser. No. 12/873,416, filed Sep. 1, 2010 (Publication No. 2011/0164307, now U.S. Pat. No. 8,363,299, issued Jan. 29, 2013), which is a continuation-in-part of application Ser. No. 12/326,402, filed Dec. 2, 2008 (Publication No. 2009/0109522, now U.S. Pat. No. 7,791,782 issued Sep. 7, 2010), which is itself a continuation of application Ser. No. 11/307, 297, filed Jan. 31, 2006 (now U.S. Pat. No. 7,513,813 issued Apr. 7, 2009), which is itself a divisional of application Ser. No. 10/904,063 filed Oct. 21, 2004 (now U.S. Pat. No. 7,110,164, issued Sep. 19, 2006), which itself is a continuation-in-part of application Ser. No. 10/249,957, filed May 22, 2003 (now U.S. Pat. No. 6,982,178, issued Jan. 3, 2006), which claims benefit of (a) Application Ser. No. 60/319,300, filed Jun. 10, 2002; and (b) Application Ser. No. 60/320,186, filed May 12, 2002.

The aforementioned application Ser. No. 10/904,063 is also a continuation-in-part of application Ser. No. 10/605,024, filed Sep. 2, 2003 (now U.S. Pat. No. 7,561,324 issued Jul. 14, 2009), which claims benefit of (c) Application Ser. No. 60/319,516, filed Sep. 3, 2002.

The aforementioned application Ser. No. 10/904,063 also claims benefit of (d) Application Ser. No. 60/481,553, filed Oct. 24, 2003; (e) Application Ser. No. 60/481,554, filed Oct. 24, 2003; (f) Application Ser. No. 60/481,557, filed Oct. 24, 2003; (g) Application Ser. No. 60/481,564, filed Oct. 27, 2003; and (h) Application Ser. No. 60/520,226, filed Nov. 14, 2003.

This application is related to application Ser. No. 10/064,389, filed Jul. 2, 2002 (now U.S. Pat. No. 6,831,769, issued Dec. 14, 2004), and claiming priority of Provisional Application Ser. No. 60/304,117, filed Jul. 9, 2001.

This application is related to (a) application Ser. No. 10/145,861, filed May 13, 2002 (now U.S. Pat. No. 6,864,875 issued Mar. 8, 2005), which is a continuation of application Ser. No. 09/436,303, filed Nov. 8, 1999 (and now abandoned), which in turn is a divisional of application Ser. No. 09/289,507, filed Apr. 9, 1999 (now U.S. Pat. No. 7,075,502, issued Jul. 11, 2006), which claims benefit of Application Ser. No. 60/081,362, filed Apr. 10, 1998; (b) copending application Ser. No. 10/687,166, filed Oct. 16, 2003 (now U.S. Pat. No. 7,259,744 issued Aug. 21, 2007), which claims benefit of Application Ser. No. 60/419,019, filed Oct. 16, 2002, and which is a continuation-in-part of copending application Ser. No. 08/983,404, filed Mar. 26, 1999 (now U.S. Pat. No. 7,106,296 issued Sep. 12, 2006), which is the United States National Phase of International Application No. PCT/US96/12000, filed Jul. 19, 1996, which is itself a continuation-in-part of application Ser. No. 08/504,896, filed Jul. 20, 1995 (now U.S. Pat. No. 6,124,851); (c) copending application Ser. No. 10/065,617, filed Nov. 4, 2002 (now U.S. Pat. No. 6,721,083), which is a continuation-in-part of application Ser. No. 10/054,721, filed Nov. 12, 2001 (now U.S. Pat. No. 6,538,801), which itself is a continuation-in-part of application Ser. No. 09/565,417, filed May 5, 2000 (now U.S. Pat. No. 6,323,989), which itself is a continuation-in-part of application Ser. No. 09/471,604, filed Dec. 23, 1999 (now U.S. Pat. No. 6,422,687), which is a divisional of application Ser. No. 08/935,800 filed Sep. 23, 1997 (now U.S. Pat. No. 6,120,588). Application Ser. No. 08/935,800 claims priority from Provisional Application Ser. No. 60/035,622, filed Sep. 24, 1996, and is also a continuation-in-part of International Application No. PCT/US96/13469, filed Aug. 20, 1996, which itself claims priority from Provisional Application Ser. No. 60/022,222, filed Jul. 19, 1996. Application Ser. No. 09/565,417 also claims priority from Provisional Application Ser. Nos. 60/132,644 and 60/132,643, both filed May 5, 1999, and Provisional Application Ser. No. 60/134,245, filed May 12, 1999. Application Ser. No. 10/054,721 also claims priority from Application Ser. No. 60/254,342, filed Dec. 8, 2000. Finally, Application Ser. No. 10/065,617 claims priority from Application Ser. No. 60/350,735, filed Nov. 12, 2001.

The entire contents of the aforementioned applications are herein incorporated by reference. The entire contents of all United States patents and published and copending Applications mentioned below are also herein incorporated by reference.

BACKGROUND OF INVENTION

The present invention relates to electro-optic displays and to processes and components for the production of such displays. As will be apparent from the description below, some aspects of the present invention are restricted to electrophoretic displays, while other aspects can make use of other types of electro-optic displays. More specifically, this invention relates to (a) electro-optic media and displays with a binder which can also serve as a lamination adhesive; (b) processes for forming flexible displays; (c) color electro-optic displays; (d) processes and components for forming electro-optic displays; and (e) processes for manufacturing a hybrid display formed from materials having differing coefficients of thermal expansion.

In the displays of the present invention, the electro-optic medium (when a non-electrophoretic electro-optic medium) will typically be a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium Thus, the term "solid electro-optic displays" includes encapsulated electrophoretic displays, encapsulated liquid crystal displays, and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in U.S. Patent Application 2003/0214695. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; and 6,753,999; and U.S. Patent Applications Publication Nos. 2002/0019081; 2002/0021270; 2002/0060321; 2002/0063661; 2002/0090980; 2002/0113770; 2002/0130832; 2002/0131147; 2002/0171910; 2002/0180687; 2002/0180688; 2002/0185378; 2003/0011560; 2003/0020844; 2003/0025855; 2003/0038755; 2003/0053189; 2003/0102858; 2003/0132908; 2003/0137521; 2003/0137717; 2003/0151702; 2003/0214695; 2003/0214697; 2003/0222315; 2004/0008398; 2004/0012839; 2004/0014265; 2004/0027327; 2004/0075634; 2004/0094422; 2004/0105036; 2004/0112750; and 2004/0119681; and International Applications Publication Nos. WO 99/67678; WO 00/05704; WO 00/38000; WO 00/38001; WO00/36560; WO 00/67110; WO 00/67327; WO 01/07961; WO 01/08241; WO 03/107,315; WO 2004/023195; and WO 2004/049045.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter be referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility, will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multi-particle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned 2004/0027327, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

As discussed in the aforementioned U.S. Pat. No. 6,312, 304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300 C. to about 600 C. Subjecting many optical components to such high temperatures, however, can be harmful to the optical components by degrading the electro-optic medium chemically or by causing mechanical damage.

This patent describes a method of manufacturing an electro-optic display comprising providing a modulating layer including a first substrate and an electro-optic material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optic display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned 2004/0027327 describes a method of assembling a solid electro-optic display (including a particle-based electrophoretic display) which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this copending application and herein to mean that the layer thus designated transmits sufficient light to enable an observer, looking through that layer, to observe the change in display states of the electro-optic medium, which will normally be viewed through the electrically-conductive layer and adjacent substrate (if present). The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0027327 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned 2004/0027327 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned 2004/0027327. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

All the aforementioned methods for assembly of solid electro-optic displays leave at least one layer of lamination adhesive between the electro-optic medium and one of the electrodes. This is disadvantageous because it is generally desirable for an electro-optic display to switch as quickly as possible, and to achieve such quick switching it is necessary to provide as high an electric field as possible across the electro-optic layer. The presence of a lamination adhesive layer together with the electro-optic layer between the electrodes necessarily reduces the electric field acting on the electro-optic layer at any given voltage between the electrodes, since some voltage drop necessarily occurs in the lamination adhesive layer; in effect, the lamination adhesive layer wastes part of the available voltage. Although one can compensate for the voltage drop across the adhesive layer by increasing the operating voltage of the display (i.e., the voltage difference between the electrodes), increasing the voltage across the electrodes in this manner is undesirable, since it increases the power consumption of the display, and may require the use of more complex and expensive control circuitry to handle the increased voltage involved.

As already mentioned, in an encapsulated electrophoretic medium, the electrophoretic layer typically comprises a binder which surrounds the capsules and maintains them in the form of a mechanically coherent layer. Other forms of solid electro-optic media may contain similar binders; for example, the matrix of a rotating bichromal member display can be regarded as a binder, as could the end walls of a microcell display. It has now been discovered that, if the properties of this binder, and, in at least some cases, the proportion of binder present in the electro-optic layer, are chosen carefully, the binder can also serve as a lamination adhesive, thus removing the need for a separate lamination adhesive layer and thus producing improved electro-optic performance in the final display.

Accordingly, in one aspect this invention provides a solid electro-optic display having a binder which also serves as a lamination adhesive.

A second aspect of the present invention relates to flexible displays. Flexible display technology is highly desirable for a number of display applications. One application in which flexibility is critical is the case in which the display is used above a mechanical or electrical sensing device where the response of the sensing device is produced by mechanical deformation, for example, by throwing a switch or by mechanically changing the spacing in a capacitor, or piezo-electric sensor, or other electrical or electronic device. The compliance and flexibility of the display is crucial in these applications; if the display layers are too stiff, more force is required to make the sensor operate, and the effective sensing resolution of the device is reduced, since more than one sensing element might be operated by applying pressure at a given point. One example of an application in which the stiffness of the display assembly has been shown to be important is in a telephone keypad, where it is desired to have a display above an array of microswitches, operated by finger pressure. The stiffness of present encapsulated displays coated on relatively thick plastic supports and using plastic backplanes has been shown to complicate the assembly of these keypads and to reduce the tactile feel of the switching operation (a "click" on closure of the switch).

Thus, in a second aspect, the present invention relates to processes for assembly of flexible electro-optic displays; these processes make use of components somewhat analogous to the aforementioned front plane laminates and double release films.

Furthermore, as already mentioned a further aspect of this invention relates to color displays. One of the problems with many electro-optic displays is the limited range of colors which each pixel of the display can produce. As discussed above, both the single and dual particle types of electrophoretic display normally only display two colors at each pixel, the colors of the particle and the suspending fluid in a single particle display, and the colors to the two types of particles in an dual particle display.

One approach to expanding the limited range of colors available from conventional electro-optic displays is to place an array of colored filters over the pixels of the display. For example, consider the effect on a display comprising white particles in a black fluid of placing an array of color filters (say red, green and blue) over the individual pixels of the display. Moving the white particles adjacent the viewing surface of a pixel covered with a red filter would color that pixel red, whereas moving the white particles of the same pixel adjacent the rear surface of the display would render the pixel black. The main problem with this approach to generating color is that the brightness of the display is limited by the pixilation of the color filter. For example, if a red color is desired, the pixels covered by red filters are set to appear red, whereas the pixels covered by green and blue filters are set to appear dark, so that only a fraction of the display surface has the desired color while the remaining portion is dark, thus limiting the brightness of any color obtained. A reflective display that was capable of three optical states (black, white and color or black, white and transparent) would significant advantages in image quality, cost and ease of manufacture.

One aspect of the present invention relates to the use shutter-mode electro-optic media to produce improved color displays.

Also, as already mentioned a further aspect of the present invention relates to processes and components for forming electro-optic displays using the front plane laminates and double release films described above. In a practical commercial, high volume process, it is necessary at present to use a thermal lamination process to attach the FPL or double release film to the backplane. The backplane may be of the direct drive segmented variety with one or more patterned conductive traces, or may be of the non-linear circuit variety (e.g. active matrix).

During the development of the processes to laminate the FPL or double release film to glass active matrix backplanes (thin film transistor arrays, or simply TFT's), numerous problems have been encountered with traditional lamination equipment. This invention provides modifications of conventional tooling that are required or desirable in order to facilitate the processing of FPL's and double release films on glass TFT's. The inventions described herein may be useful in the design of lamination tools for FPL- or double release film-based displays that use plastic or metal foil backplanes as well.

Finally, this invention relates to processes for manufacturing a hybrid display formed from materials having differing coefficients of thermal expansion. Electro-optic displays may be built using two plates of glass. The first plate forms a front surface and provides one or more electrodes for addressing an electro-optic medium. The second plate forms a back surface and provides one or more electrodes (and possibly non-linear elements such as thin film transistors) for addressing the electro-optic medium. Ideally, the materials used to form the front and back plates are similar in certain mechanical properties, such as their coefficient of thermal expansion (CTE) and the coefficient of relative humidity expansion (CHE). Further, in some instances, it is desirable for the materials to have selected combinations of thickness and Young's Modulus (E) in order to satisfy certain requirements for manufacture.

In other cases, such as when a display is formed using an FPL and a glass or similar rigid backplane, the resultant "hybrid" electro-optic display inevitably has its front and back "plates" of materials that differ in their mechanical properties. Such hybrid displays give rise to new challenges in their manufacture. For example, a display constructed using an encapsulated electrophoretic FPL and a glass TFT backplane has, in effect, a plastic front plate laminated to a glass backplane in what is fundamentally an asymmetric stack of dissimilar materials. As a result of this construction, the display exhibits mechanical behavior that is not found in a traditional glass/glass display. Specifically, the asymmetric construction leads to curl (warping) of the composite panel as a function of panel temperature or humidity changes. The stresses and strains associated with warping place extreme challenges on the design of such systems. Accordingly, there is a need for panel processing, materials, and construction methodology that lead to acceptable performance of the panel over a wide range of operating environments, and the present invention seeks to meet these needs.

SUMMARY OF INVENTION

Accordingly, in one aspect this invention provides a process for producing an encapsulated electrophoretic display, the process comprising:
    providing an electrophoretic medium comprising a plurality of discrete droplets in a polymeric binder, each droplet comprising a plurality of charged particles dispersed in a suspending fluid and capable of moving therethrough on application of an electric field to the suspending fluid;
    providing a backplane having at least one electrode; and
    laminating the electrophoretic medium to the backplane at a temperature at which the polymeric binder will flow and with the electrophoretic medium in direct contact with the backplane, thereby causing the polymeric binder to flow and secure the electrophoretic medium to the backplane to form the display.

As will readily be apparent to those skilled in the manufacture of electro-optic displays, this process differs from conventional processes for lamination of electro-optic media to backplanes in that no lamination adhesive is needed between the electro-optic display and the backplane; in effect, the polymeric binder functions as both a binder and a lamination adhesive. Accordingly, this process may for convenience hereinafter be called the "adhesive-less" process of the invention.

In this process, the electrophoretic medium may be of any of the types previously described. Thus, for example, the electrophoretic medium may be a conventional encapsulated electrophoretic medium, in which each droplet is confined within a capsule wall separate from the polymeric binder (although such a capsule wall may itself be formed from a polymeric material). Alternatively, the electrophoretic medium may be of the polymer-dispersed type, with the droplets forming the discontinuous phase of a two-phase system and being surrounded by a continuous phase forming the polymeric binder.

In the adhesive-less process of the present invention, the electrophoretic medium may be disposed on a light-transmissive substrate so that, following the lamination, the electrophoretic medium is sandwiched between the substrate and the backplane. A light-transmissive electrode may be disposed between the electrophoretic medium and the substrate, and the electrophoretic medium may be provided with a release sheet covering its surface remote from the substrate (i.e., the electrophoretic medium may be incorporated into a front plane laminate as described in the aforementioned 2004/0027327) and the release sheet removed prior to the lamination.

In the adhesive-less process, the lamination is conducted at a temperature sufficient to cause the polymeric binder to flow, so that the binder will flow and secure the electrophoretic medium to the backplane. The temperature used should, of course, not be so high as to cause unacceptable damage to the electrophoretic medium or to any other temperature-sensitive component present. Thus, the binder should be chosen so that it flows at a temperature which permits the lamination to be effected without damage to the electrophoretic medium or other component. In general, it is desirable to use a polymeric binder which flows at a temperature of not more than about 150° C., and preferably not more than about 100° C. As explained in detail in the aforementioned 2003/0025855, the choice of lamination adhesives for use in electrophoretic displays is complicated because a large number of factors have to be considered, including the electrical properties of the adhesive, and the same factors apply to a polymeric binder also functioning as a lamination adhesive. Accordingly, for the same reasons as discussed in the aforementioned 2003/0025855, it is generally preferred that the polymeric binder used in the adhesive-less process be a polyurethane.

For reasons discussed in more detail below, the ratio of polymeric binders to droplets in the electrophoretic medium used in the adhesive-less process is normally higher than in prior art processes using an adhesive separate from the binder. In the adhesive-less process, typically the polymeric binder will comprise at least about 20, and desirably at least about 30, percent by weight of the electrophoretic medium.

The backplane used in the adhesive-less process may be of any of the types known in the art. For example, the backplane may be of the direct drive type, having a plurality of pixel electrodes and conductive traces by which the potentials on the pixel electrodes can be independently controlled. Alternatively, the backplane may be an active matrix backplane comprising a plurality of pixel electrodes and at least one non-linear element associated with each pixel electrode.

This invention also provides an electrophoretic medium (which may hereinafter be called the "adhesive-less medium" of the present invention) intended for use in the adhesive-less process described above. This electrophoretic medium comprises a plurality of discrete droplets of electrophoretic medium in a polymeric binder, each droplet comprising a plurality of charged particles dispersed in a suspending fluid and capable of moving therethrough on application of an electric field to the suspending fluid, wherein the polymeric binder flows at a temperature of not more than about 150° C.

In this adhesive-less medium, desirably the polymeric binder flows at a temperature of not more than about 100° C. The electrophoretic medium may be of any of the types previously described. Thus, for example, the electrophoretic medium may be a conventional encapsulated electrophoretic medium, in which each droplet is confined within a capsule wall separate from the polymeric binder (although such a capsule wall may itself be formed from a polymeric material). Alternatively, the electrophoretic medium may be of the polymer-dispersed type, with the droplets forming the discontinuous phase of a two-phase system and being surrounded by a continuous phase forming the polymeric binder.

The adhesive-less medium of the present invention may be used in combination with a light-transmissive substrate covering one surface of the medium, optionally with a light-transmissive electrode disposed between the electrophoretic medium and the substrate. The electrophoretic medium may be provided with a release sheet covering its surface remote from the substrate (i.e., the electrophoretic medium may be incorporated into a front plane laminate as described in the aforementioned 2004/0027327).

For reasons discussed above, in the adhesive-less medium, typically the polymeric binder will comprise at least about 20, and desirably at least about 30, percent by weight of the electrophoretic medium, and the polymeric binder may comprise a polyurethane.

This invention also provides an article of manufacture comprising, in order:
  a light-transmissive electrically-conductive layer;
  an electrophoretic medium comprising a plurality of discrete droplets of electrophoretic medium in a polymeric binder, each droplet comprising a plurality of charged particles dispersed in a suspending fluid and capable of moving therethrough on application of an electric field to the suspending fluid, the polymeric binder flowing at a temperature of not more than about 150° C.; and
  a release sheet in contact with the polymeric binder.

This article of manufacture is in effect a front plane laminate as described in the aforementioned 2004/0027327, modified to replace the electrophoretic medium and lamination adhesive layers of the original front plane laminate with a electrophoretic medium having a binder which can also function as a lamination adhesive, in accordance with the present invention.

This invention also provides an article of manufacture comprising:
  a layer of an electrophoretic medium comprising a plurality of discrete droplets of electrophoretic medium in a polymeric binder, each droplet comprising a plurality of charged particles dispersed in a suspending fluid and capable of moving therethrough on application of an electric field to the suspending fluid, the polymeric binder flowing at a temperature of not more than about 150° C., the layer having first and second surfaces on opposed sides thereof;

a first release sheet covering the first surface of the layer of electrophoretic medium; and a second release sheet covering the second surface of the layer of electrophoretic medium.

This article of manufacture is in effect a double release sheet as described in the aforementioned 2004/0027327, modified to replace the electrophoretic medium and lamination adhesive layers of the original front plane laminate with an electrophoretic medium having a binder which can also function as a lamination adhesive, in accordance with the present invention.

For reasons explained below, the adhesive-less process of the present invention is especially useful in producing color electrophoretic displays incorporating color filter arrays. Accordingly, this invention provides a process for producing an assembly useful in the production of an encapsulated electrophoretic display, the process comprising: providing an electrophoretic medium comprising a plurality of discrete droplets in a polymeric binder, each droplet comprising a plurality of charged particles dispersed in a suspending fluid and capable of moving therethrough on application of an electric field to the suspending fluid; providing a front sub-assembly comprising a light-transmissive electrically-conductive layer and a color filter array; and laminating the electrophoretic medium to the front-assembly at a temperature at which the polymeric binder will flow, thereby causing the polymeric binder to flow and secure the electrophoretic medium to the front sub-assembly to form the assembly, with the light-transmissive electrically-conductive layer disposed between the color filter array and the electrophoretic medium.

In this process, the electrophoretic medium may be provided with a release sheet covering its surface which will be laminated to the front sub-assembly, and the release sheet is removed prior to the lamination. The process may further comprise laminating the assembly to a backplane comprising at least one electrode, thereby causing the polymeric binder to flow and secure the electrophoretic medium to the backplane, and where such a lamination to a backplane is included, the electrophoretic medium may be provided with a release sheet covering its surface which is to be laminated to the backplane, and the release sheet is removed prior to the lamination. The polymeric binder may comprise from about 33 to about 67 percent of the electrophoretic layer, and after the lamination, the polymeric binder may be cured so that it no longer flows at a temperature of about 150° C.

The present invention also provides an article of manufacture comprising, in order: a color filter array; a light-transmissive electrically-conductive layer; an electrophoretic medium comprising a plurality of discrete droplets of electrophoretic medium in a polymeric binder, each droplet comprising a plurality of charged particles dispersed in a suspending fluid and capable of moving therethrough on application of an electric field to the suspending fluid, the polymeric binder flowing at a temperature of not more than about 150° C.; and a release sheet in contact with the polymeric binder.

In another aspect, this invention provides a process for forming a sub-assembly for use in an electro-optic display, this process comprising:

depositing a layer of an electro-optic medium on a first release sheet;

depositing a layer of a lamination adhesive on a second release sheet; and thereafter contacting the electro-optic medium on the first release sheet with the lamination adhesive on the second release sheet under conditions effective to cause the lamination adhesive to adhere to the electro-optic medium, thereby forming a sub-assembly comprising the lamination adhesive and the electro-optic medium sandwiched between the two release sheets.

This process, which is primarily, although not exclusively, intended for use in the assembly of flexible displays, may hereinafter for convenience be called the "flexible sub-assembly process" of the present invention. This process may further comprise removing the first release sheet from the sub-assembly and laminating the electro-optic medium to a backplane comprising at least one electrode. The process may further comprise laminating a layer of laminating adhesive to the backplane prior to laminating the electro-optic medium thereto.

In another aspect, this invention provides apparatus for displaying a color image, this apparatus comprising an electro-optic display having a plurality of pixels, each of which can be independently set to a light-transmissive optical state or a substantially opaque optical state, and lighting means arranged to flash separate pulses of light of at least two differing colors on to one surface of the electro-optic display.

In a further aspect, this invention provides apparatus for generating pulses of light of differing colors, the apparatus comprising a light source and a filter assembly arranged to receive light from the light source, the filter assembly comprising:

a first electro-optic layer having a light-transmissive state and a colored state having a first optical characteristic;

a first electrode arranged to apply to the first electro-optic layer an electric field capable of switching the first electro-optic layer between its light-transmissive and colored states;

a second electro-optic layer having a light-transmissive state and a colored state having a second optical characteristic different from the first optical characteristic; and a second electrode arranged to apply to the second electro-optic layer an electric field capable of switching the second electro-optic layer between its light-transmissive and colored states.

In a further aspect, this invention provides a method of generating a color image, the method comprising:

flashing a first pulse of light having a first color on to a first surface of an electro-optic display, the electro-optic display having a plurality of pixels, each of which can be independently set to a light-transmissive optical state or a substantially opaque optical state, the electro-optic display also having a second surface on the opposed side of the display from the first surface;

driving a first sub-set of the plurality of pixels to their light-transmissive optical state and the remaining pixels to their substantially opaque optical state, thereby causing a first image in the first color to be displayed in the second surface of the electro-optic display;

flashing a second pulse of light having a second color different from the first color on to the first surface of an electro-optic display; and driving a second sub-set, different from the first sub-set of the plurality of pixels to their light-transmissive optical state and the remaining pixels to their substantially opaque optical state, thereby causing a second image in the second color to be displayed in the second surface of the electro-optic display.

In a further aspect, this invention provides a method of generating pulses of light of differing colors, the method comprising:
providing a first electro-optic layer having first surface, a light-transmissive state and a colored state having a first optical characteristic;
providing a second electro-optic layer disposed adjacent the first electro-optic layer on the opposed side thereof from the first surface, the second electro-optic layer having a light transmissive state and a colored state having a second optical characteristic different from the first optical characteristic, the second electro-optic layer having a second surface on the opposed side of the second electro-optic layer from the first electro-optic layer;
directing substantially white light on to the first surface;
setting the first electro-optic layer to its colored state and the second electro-optic layer to its light-transmissive state, thereby causing light having the first optical characteristic to emerge from the second surface; and
setting the first electro-optic layer to its light-transmissive state and the second electro-optic layer to its colored state, thereby causing light having the second optical characteristic to emerge from the second surface.

In another aspect, this invention provides a first method for manufacturing a hybrid display, this first method comprising:
(a) providing a front plane laminate comprising an electro-optic layer and a substrate, the front plane laminate having a first coefficient of thermal expansion (CTE);
(b) producing an electro-optic display by laminating the front plane laminate to a backplane comprising at least one electrode, the backplane having a second CTE;
(c) heating the display to a temperature above a threshold temperature, thereby producing a heated display with a curvature; and
(d) gradually lowering the temperature to an ambient temperature to release structural stress resulting from any differential expansion of the front plane laminate and the backplane such that the curvature is substantially reduced.

In another aspect, this invention provides a second method for manufacturing a hybrid display, this second method comprising:
(a) adhering a front plane laminate comprising a first material having a first coefficient of thermal expansion (CTE) to a backplane comprising a second material having a second CTE, thereby producing a hybrid display with a first curvature; and
(b) reducing the curvature of the hybrid display by forcing the display to temporarily assume a second curvature opposite the first curvature.

In another aspect, this invention provides a third method for manufacturing a hybrid display, this third method comprising:
(a) providing a front plane laminate comprising a first material having a first coefficient of thermal expansion (CTE);
(b) adhering a backplane comprising a second material having a second CTE to the front plane laminate; and
(c) producing a hybrid display by adhering a third panel comprising a material different from the second material to the backplane such that the overall curvature of the hybrid panel is substantially reduced compared to a display consisting of only the front plane laminate and the backplane but not the third panel.

Finally, this invention provides a fourth method for manufacturing a hybrid display, this fourth method comprising:
(a) adjusting a front plane laminate comprising a first material having a first coefficient of thermal expansion (CTE) to a first temperature;
(b) adjusting a backplane comprising a second material having a second CTE to a second temperature; and
(c) adhering the temperature-adjusted front plane laminate to the temperature-adjusted backplane to produce a hybrid display.

In each of the aforementioned methods for manufacturing a hybrid display, the front plane laminate may comprise an electrophoretic layer, which may be of any of the types previously mentioned.

DETAILED DESCRIPTION

Figure 1:
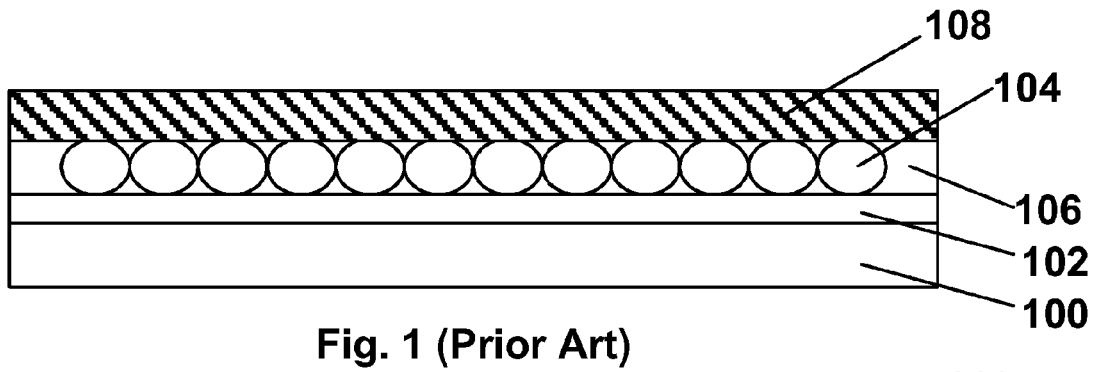
FIG. 1 of the accompanying drawings is a schematic section through a prior art front plane laminate as described in the aforementioned 2004/0027327, but with the release layer removed ready for lamination to a backplane.

As already indicated, this invention has several different aspects relating to electro-optic displays and to processes and components for the production of such displays. These various aspects will mainly be described separately below, but it should be understood that a single display, process or component may make use of more than one aspect of the invention. For example, the various processes of the invention for manufacturing hybrid displays may be carried out using a front plane laminate of the invention.

Adhesive-Less Process, Medium, Front Plane Laminate and Double-Release Film

All of the above aspects of the present invention are grouped together because they all relate to eliminating the lamination adhesive conventionally used between an encapsulated electrophoretic medium and at least one other component of an electrophoretic display; this other components is typically a backplane, but in some cases the present invention may allow elimination of a lamination adhesive between an electrophoretic medium and a front substrate, which provides the viewing surface through which an observer is intended to view the display. As already mentioned, the elimination of the lamination adhesive is effected by using in the electrophoretic medium a binder which can flow at the temperature used for lamination, so that in effect the binder also serves as the lamination adhesive. The concept of flow is complicated but herein it refers to a polymeric material that has passed through the transition from elastic to plastic or viscous behavior.

The binder used in the adhesive-less medium and process of the invention must of course be chosen not only with regard to its flow temperature but also with regard to its compatibility with the other components of the electrophoretic medium and the requirements for driving this medium, including in particular the resistivity of the binder. Desirably, the binder flows at a temperature of not more than about 150° C., and preferably at a temperature of not more than about 100° C. In general, the preferred type of binder is a polyurethane; it has been found that certain polyurethanes can meet these preferred flow temperatures while still being compatible with all the other components conventionally used in electrophoretic media.

Also, in choosing the binder to be used in the adhesive-less medium and process of the invention, attention should be given not only to the type of binder used but also to the proportion of binder. As discussed in several of the E Ink and MIT patents and applications mentioned above, encapsulated electrophoretic media prepared by coating a mixture of capsules and binder on to a substrate, or media of the polymer-dispersed type, tend to have a non-planar surface, since the individual capsules or droplets form "bumps" on the surface of the dried and/or cured electrophoretic medium, and this is especially true when (as is preferably the case) the medium consists essentially of a single layer of capsules or droplets. In a conventional process using a lamination adhesive, the lamination adhesive serves not only to adhere the electrophoretic medium to a backplane or other component, but also to planarize the original non-planar surface of the electrophoretic medium, thus avoiding various problems (for example, the formation of voids and uneven response of the electrophoretic medium to applied electric fields) which might otherwise occur if the non-planar surface of the electrophoretic medium is laminated to a planar surface of a backplane or other component.

When the lamination adhesive is eliminated in accordance with the present invention, in order to avoid such problems, it is highly desirable that the flowable binder replace not the adhesive function of the lamination adhesive previously used but also its planarizing function, and to enable the flowable binder to do so, it has been found generally desirable to use a higher proportion of binder in the adhesive-less electrophoretic of the present invention than is typically employed in prior art electrophoretic media intended for use with lamination adhesives. Consider, for example, an idealized encapsulated electrophoretic medium comprising a single layer of hexagonally close-packed spherical capsules resting on a substrate. The volume fraction of the layer occupied by the capsules is approximately 60.5 percent, leaving 39.5 percent by volume of the layer to be occupied by the binder. This suggests that a capsules to binder volume ratio of about 3:2 would suffice to enable the binder to fill all of the space between the capsules, thus planarizing the capsule layer. Further consideration of this idealized system suggests that a slightly greater proportion of binder (for example, a capsules to binder volume ratio of 1:1) is desirable to ensure that excess binder overlies the capsule layer, thus reducing the chance that capsule walls might be damaged, and perhaps burst, during the lamination process.

However, as explained in several of the E Ink and MIT patents and applications mentioned above (see especially U.S. Pat. Nos. 6,067,185 and 6,392,785), encapsulated electrophoretic media produced in practice differ significantly from the idealized model, in that the originally spherical capsules become flattened into oblate ellipsoids as the layer of electrophoretic medium shrinks during drying or curing, and that, in at least some cases, as the shrinkage continues, the oblate ellipsoids contact each other and develop planar areas of contact extending substantially perpendicular to the thickness of the layer, so that eventually the capsules have substantially the form of prisms, ideally hexagonal prisms. Similar effects are observed with polymer-dispersed electrophoretic media. Oblate ellipsoidal and prismatic capsules occupy a substantially greater proportion of the electrophoretic medium than close-packed spherical capsules, so that less binder is needed in the former cases. In addition, the foregoing discussion has focused on volume ratios, and the density of most binders tends to somewhat higher than that of most electrophoretic media, the greater part of which are composed of a low density aliphatic hydrocarbon suspending fluid, so that the proportion by weight of the binder may be somewhat higher than the proportion by volume. The optimum proportion of binder for use in any particular medium is best determined empirically, but by way of general guidance it may be stated that the polymeric binder should typically comprise at least about 20 percent, and desirably at least about 30 percent by weight of the electrophoretic medium (these ratios are of course calculated on the weight of essentially dry capsules and on the solids basis for the binder, since the binder is typically added as a latex). Typically, the optimum ratio will be 2 to 3 parts by weight of capsules per part by weight of polymeric binder. The use of a large excess of binder should be avoided, since such an excess tends to "dilute" the capsules beyond the point at which they are well-packed and hence degrade the electro-optic performance of the medium.

The lamination step of the adhesive-less process of the present invention may be conducted using any of the techniques known in the art. Thus, for example, the lamination may be effected using a roll-to-roll process by passing a front plane laminate of the invention (with the release sheet stripped therefrom) and a roll of backplanes formed on a flexible substrate, between the heated rolls of a laminator.

The front plane laminate and double release film of the present invention may include any of the optional features described in the aforementioned 2004/0027327 and 2004/0155857. Thus, for example, the front plane laminate may be provided with a conductive via and a contact pad as described in 2004/0027327. The release sheet of the front plane laminate may be provided with an electrically conductive layer to facilitate testing of the front plane laminate in the manner described above.

The front plane laminate of the present invention not only eliminates a layer (namely the lamination adhesive layer) from the prior art FPL but also simplifies the overall assembly process. In the prior art process described in the aforementioned 2004/0027327, an FPL is typically formed by coating a capsule/binder slurry on to a substrate comprising a polymeric film bearing an indium-tin-oxide (ITO) layer, the slurry being coated on to the ITO-covered surface of the film. The resultant capsule-coated film then undergoes a first lamination in which a layer of lamination adhesive is laminated to the exposed surface of the capsule/binder layer, and then the release sheet is applied to form the FPL. When the FPL is to be assembled into a display, the release sheet is removed and a second lamination is effected to secure the lamination adhesive to a backplane, thus forming the final display. The present invention enables the first lamination to be eliminated, thus simplifying the overall process for production of the display.

This aspect of the invention will now be illustrated with reference to FIGS. 1 to 4 of the accompanying drawings. As already mentioned, FIG. 1 shows a prior art front plane laminate as described in the aforementioned 2004/0027327, but with the release layer removed ready for lamination to a backplane. As shown in FIG. 1, the front plane laminate comprises a front substrate 100, formed from a polymeric film and bearing a layer 102 of indium tin oxide (the thickness of the layer 102 is greatly exaggerated compared to that of the substrate 100 for ease of illustration), which will form the common front electrode of the eventual display. The front plane laminate further comprises an electrophoretic layer comprising capsules 104 in a binder 106, and a lamination adhesive layer 108.

Figure 2:
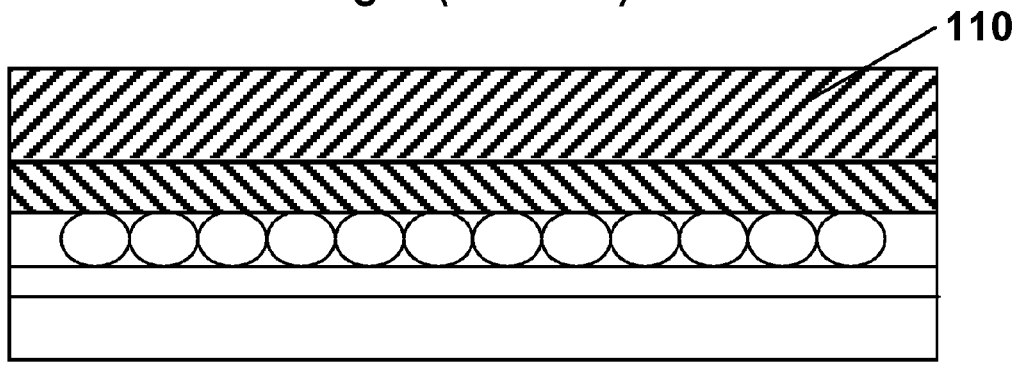
FIG. 2 is a schematic section showing a prior art display resulting from laminating the front plane laminate shown in FIG. 1 to a backplane containing pixel electrodes.

FIG. 2 shows the structure resulting from laminating the front plane laminate of FIG. 1 to a backplane 110 containing pixel electrodes (not shown). It will be seen that, in the laminate of FIG. 2, both the electrophoretic layer 104/106 and the adhesive layer 108 are present between the front plane electrode layer 102 and the pixel electrodes.

Figure 3:
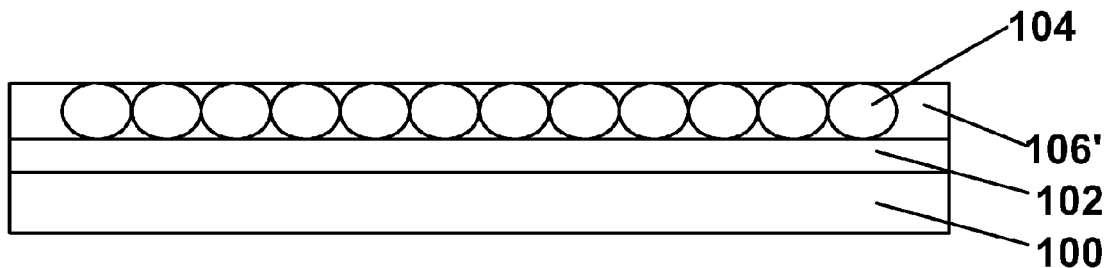
FIG. 3 is a schematic section, similar to that of FIG. 1, through a front plane laminate of the present invention, again with the release layer removed ready for lamination to a backplane.

FIG. 3 shows a front plane laminate of the present invention, again with the release layer removed ready for lamination to a backplane. The front plane laminate of FIG. 3 is generally similar to that of FIG. 1 but has a thermally flowable binder 106' and lacks an adhesive layer.

Figure 4:
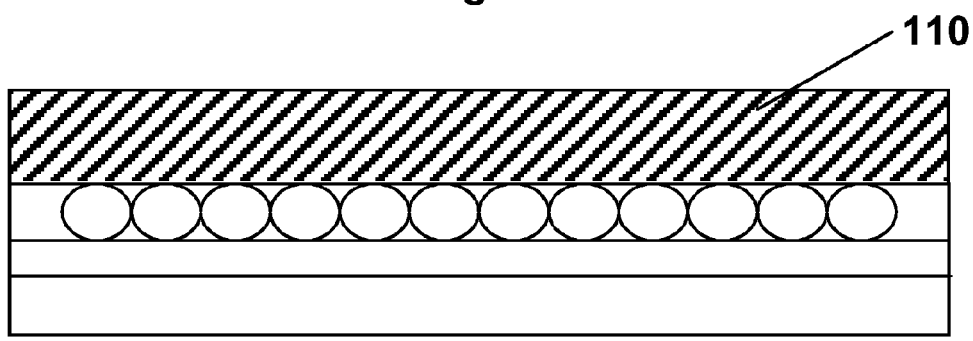
FIG. 4 is a schematic section, similar to that of FIG. 2, showing a display resulting from laminating the front plane laminate shown in FIG. 1 to a backplane containing pixel electrodes.

Finally, FIG. 4 shows the structure resulting from laminating the front plane laminate of FIG. 3 to a backplane 110. It will be seen that, in the laminate of FIG. 4, only the electrophoretic layer 104/106 is present between the front plane electrode layer 102 and the pixel electrodes. Because of the elimination of the adhesive layer between the electrodes, at any given operating voltage, the laminate of FIG. 4 will typically switch substantially faster than that of FIG. 2.

The following Example is now given, though by way of illustration only, to illustrate a preferred embodiment of the invention.

Example

Dual particle opposite polarity electrophoretic capsules containing polymer-coated titania and carbon black particles in an aliphatic hydrocarbon suspending fluid and with gelatin/acacia capsule walls were prepared substantially as described in Example 30 of the aforementioned 2002/0185378. These capsules were then mixed at a weight ratio of 1:1 (capsules/binder solids basis) with a custom polyurethane latex binder, and the resultant slurry slot coated, substantially as described in this Example 30, on to a 5 mil (127 μm) poly(ethylene terephthalate) (PET) film coated on one surface with ITO, the slurry being coated on to the ITO-covered surface, and cured to produce a final capsule/binder layer comprising essentially a monolayer of capsules and 15-30 μm thick. The resultant capsule-coated film was essentially an FPL of the present invention except that it lacked a release sheet which was not needed since the coated film was used immediately as described below.

The capsule coated film was then laminated using a hot roll laminator to a backplane comprising a polymeric film covered with a graphite layer, the electrophoretic layer being contacted with the graphite layer, and the resultant structure cut to a size of 2 inch square (51 mm square) to produce experimental single-pixel displays, which exhibited satisfactory electro-optic properties.

Further similar experiments indicated that satisfactory electro-optic properties could be obtained at lower binder to capsule weight ratios of about 1:2 to 1:3.

The adhesive-less medium of the present invention is especially useful in color displays using a front color filter array (CFA), this is to say, a color filter array which is disposed on the front substrate of the display so that the CFA forms the viewing surface of the display. Such a CFA will typically have stripes or other areas of red, green and blue, or red, green, blue and white. When making a color electrophoretic (or similar reflective media) display, the distance from the CFA to the reflective (scattering) electro-optic layer is critical to avoid color shifting with increased viewing angle, referred to in the art as "parallax". Those skilled in the technology of electro-optic displays will appreciate that such color shifting can arise from light rays inclined to the normal to the viewing surface entering through one colored area and, after reflection from the electro-optic medium, exiting through a different colored area, and that accordingly such color shifting increases with the distance from the CFA to the electro-optic layer.

Figure 5:
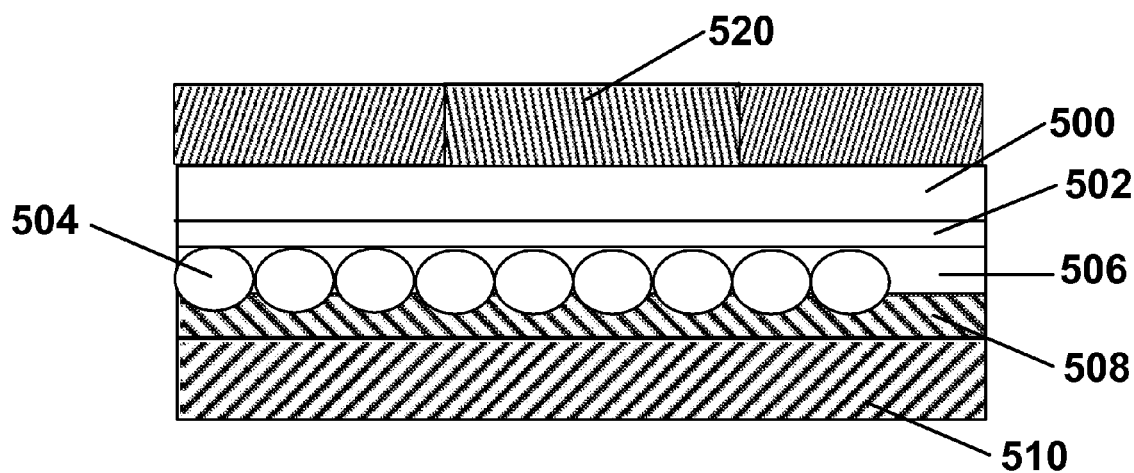
FIG. 5 is a schematic cross-section, similar to that of FIG. 2, through a prior art color electrophoretic display incorporating a color filter array and a single lamination adhesive layer.
Figure 6:
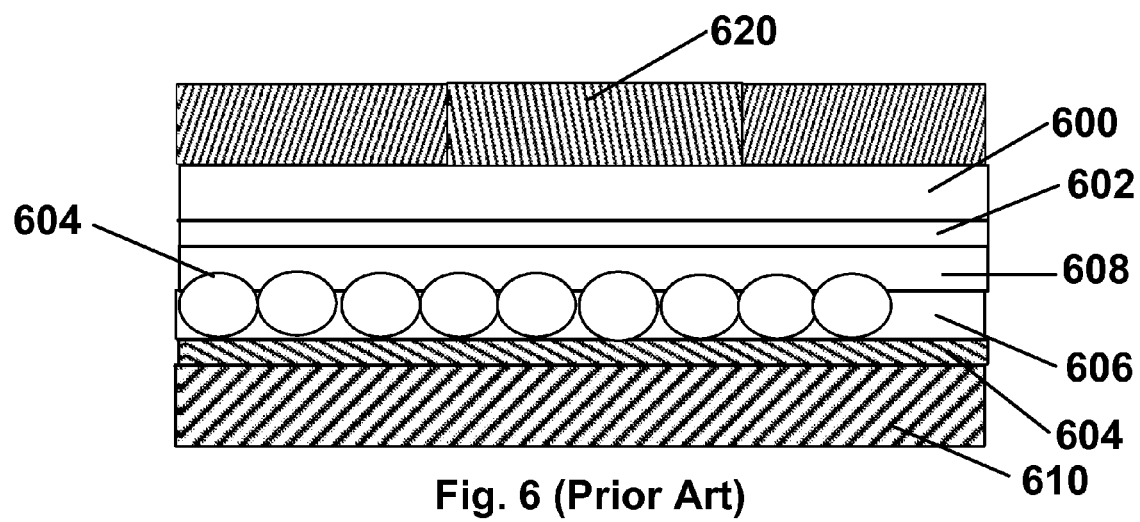
FIG. 6 is a schematic cross-section, similar to that of FIG. 5, through a further prior art color electrophoretic display incorporating a color filter array and two discrete lamination adhesive layers.

There are two main prior art processes for production of electrophoretic CFA displays, and the resultant display structures are illustrated in FIGS. 5 and 6. In the first process, illustrated in FIG. 5 and generally similar to that illustrated in FIG. 1 above, the electrophoretic layer (illustrated as comprising capsules 504 in a binder 506) is coated directly on to a film comprising an electrode 502 on a substrate 500. The substrate 500 may have been previously secured to a CFA 520 or the CFA may be attached at a later stage of the process. Separately, a relatively thick layer (about 25 μm) of adhesive 508 is coated on to a release sheet (not shown, and the resulting sub-assembly is laminated to the sub-assembly containing the electrophoretic layer to that the adhesive layer 508 contacts the electrophoretic layer. The release layer is then removed and the adhesive layer 508 is laminated to a backplane 510 to form the final display.

Alternatively, as illustrated in FIG. 6, which is generally similar to FIG. 2, a relatively thick layer (about 25 µm) of adhesive 608 is coated directly on to a film comprising an electrode 602 on a substrate 600. The substrate 600 may have been previously secured to a CFA 620 or the CFA may be attached at a later stage of the process. Separately, an electrophoretic layer (illustrated as comprising capsules 604 in a binder 606) is coated on to a release sheet (not shown) and laminated to the substrate/electrode/adhesive sub-assembly so that the electrophoretic layer contacts the adhesive 608. Separately, a thin layer (about 10 µm) of adhesive 612 is coated on to a further release sheet, the release sheet covering the electrophoretic layer is removed, and the thin layer of adhesive 612 is laminated to the electrophoretic layer. The release sheet covering the thin layer of adhesive is removed and the thin layer of adhesive is laminated to a backplane 610. The use of the (second) thin layer of adhesive 612 in this process is enabled by the flatness of the electrophoretic layer which have previously been coated on to a release film; since these capsules are substantially planar on their face adjacent the adhesive 612, there is no need for a thick layer of adhesive to planarize the rough surface typically found on the surface of a capsule layer remote from the surface on which the capsule layer has been coated.

Each of these two processes has major disadvantages. In the first process, the coating of the electrophoretic layer directly on to the electrode/substrate film reduces the distance between the electrophoretic layer and the CFA in the final display, and thus reduces parallax, but the surface of electrophoretic layer remote from the electrode/substrate film tends to be very rough, and accordingly a thick adhesive layer 508 is needed to planarize the rough surface and attach the electrophoretic layer to the backplane without creating voids causes a substantial proportion of the voltage drop between the electrodes to occur within the thick adhesive layer, thus reducing the switching speed and optical performance of the display (which is dependent upon the voltage drop across the electrophoretic layer itself). In the second process, the thick layer of adhesive 608 lies in contact with the common front electrode 602 so that the adhesive can be made more conductive than an adhesive layer lying adjacent a backplane (since lateral conduction within the adhesive layer is of less concern), and hence the voltage drop across the adhesive 608 can be reduced, and the electrophoretic layer switching speed and optical performance improved. However, the presence of the thick adhesive layer 608 between the CFA and the electrophoretic layer is detrimental to parallax.

The use of an adhesive-less medium of the present invention can avoid the disadvantages of both prior art processes described above and provide CFA color electro-optic displays which combine low parallax, high resolution and good temperature performance. In effect, use of a binder in the electro-optic layer which also serves as an adhesive minimizes the amount of "adhesive" present both between the electro-optic layer and the backplane (thus avoiding the resolution and performance issues associated with a thick adhesive layer in this location) and between the electro-optic and the CFA (thus minimizing parallax.

As with other adhesive-less media of the present invention previously discussed, the binder used in an adhesive-less medium used in combination with a CFA should flow at a temperature of not more than about 150° C., and preferably at a temperature of not more than about 100° C.; the binder must also, of course, be chemically compatible with the other components of the electro-optic layer. Desirably, the binder used should be capable of being cured thermally or by radiation exposure (typically ultra-violet exposure) after adhesion to the front substrate and/or backplane so that after curing the binder will no longer flow at elevated temperatures (typically 150° C. or higher).

Figure 7:
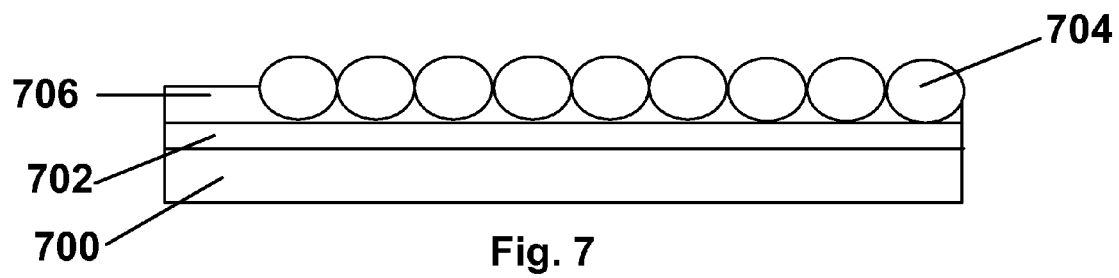
FIGS. 7 and 8 are schematic cross-sections through two different encapsulated electrophoretic media deposited on substrates and illustrate the effect of binder:capsule ratio on the structure of the electrophoretic medium.
Figure 8:
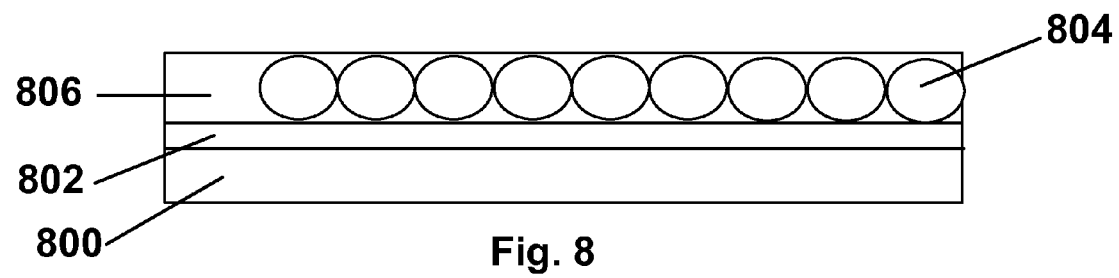

Also, as previously discussed, the electro-optic layer should be modified by changing the amount of binder present. If the amount of binder present is too low (and typically in prior art encapsulated electrophoretic displays the weight ratio of capsules to binder is in the range of about 8:1 to about 15:1), the electrophoretic layer contains so little binder that the capsules tend to protrude from the binder, as illustrated in FIG. 7, which illustrates a sub-assembly resulting from coating an electrophoretic layer comprising capsules 704 in a binder 706 on to a film comprising an electrode layer 702 on a substrate 700. It will be seen from FIG. 7 that the capsules 704 protrude significantly above the surrounding surface of the binder 706, thus resulting in a highly non-planar exposed surface of the electrophoretic layer which does not allow for good adhesion to a backplane. In contrast, FIG. 8 shows a sub-assembly similar to that of FIG. 7 but in which the weight ratio of capsules to binder is in the range of about 0.5:1 to about 2:1, so that the binder comprises from about 33 to about 67 percent of the electrophoretic layer. This creates an electrophoretic layer that is rich in the binder material and provides sufficient binder that the capsules 804 do not project above the surrounding surface of the binder 806, so that the exposed surface of the electrophoretic layer is substantially planar and the flowable binder 806 can provide good adhesion to a backplane without requiring the provision of a separate adhesive material and without leaving any voids between the electrophoretic layer and the backplane.

Figure 9:
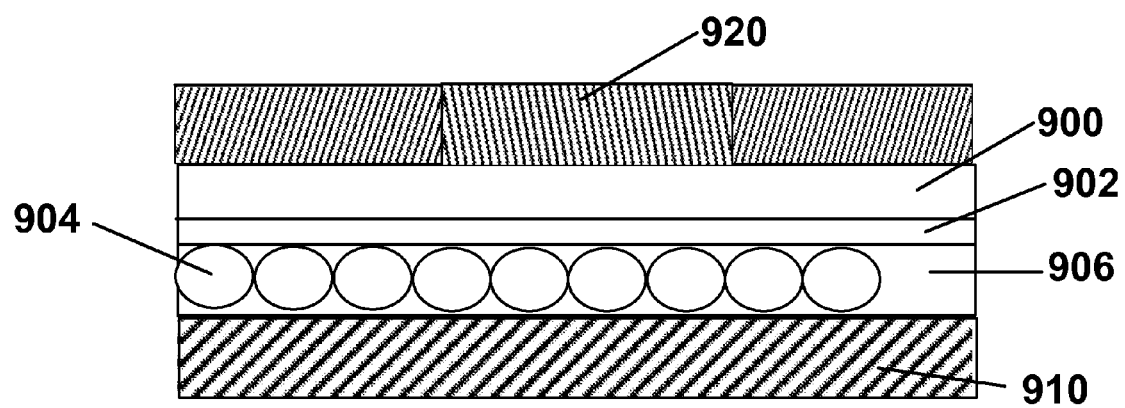
FIG. 9 is a schematic cross-section, similar to those of FIGS. 5 and 6, through a color electrophoretic display of the present invention produced by the adhesive-less process.

FIG. 9 is a schematic cross-section, generally similar to those of FIGS. 5 and 6, through a color electrophoretic display of the present invention, which may be produced using the sub-assembly of FIG. 8. It will be seen that the layers in the front section of the display of FIG. 9 are similar to those of FIG. 5 and comprise a color filter array 920, a front substrate 900, an electrode layer 902 and an electrophoretic layer comprising capsules 904 in a binder 906. However, unlike the display shown in FIG. 5, in the display shown in FIG. 9, the electrophoretic layer is in direct contact with a backplane 910 without any intervening adhesive layer corresponding to layer 508 in FIG. 5; the flowable binder 906 of the electrophoretic layer serves as the adhesive which secures the electrophoretic layer directly to the backplane 910.

As may readily be seen by comparison of FIG. 9 with FIGS. 5 and 6, the display of FIG. 9 lacks the single adhesive layer 508 of the display of FIG. 5, and the two adhesive layers 608 and 612 of the display of FIG. 6. Accordingly, the display of FIG. 9 allows the CFA to be as close as possible to the electrophoretic layer, thus minimizing parallax, and provides a thin display lacking any discrete adhesive layers, thus optimizing switching speed and optical performance of the electrophoretic layer.

It will be appreciated that, in theory, the substrate 900 shown in FIG. 9 could be eliminated and the electrode layer 902 formed directly upon the color filter array 920, thus further reducing parallax. However, in practice this is difficult to achieve; the front electrode layer is typically a sputtered layer of indium tin oxide (ITO) or a similar metal oxide, and most CFA's do not have the mechanical properties required for passage through a commercial sputtering apparatus.

Flexible Sub-Assembly Process

The flexible sub-assembly process of the present invention allows for the assembly of a very flexible and compliant display well adapted for use in applications such as described above in which flexibility is of paramount importance. A preferred sub-assembly process will be described with reference to FIGS. 10 to 14 of the accompanying drawings.

Figure 10:
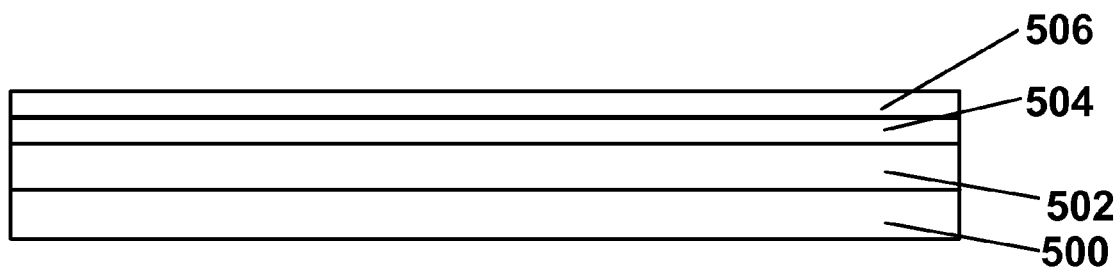
FIGS. 10 to 14 are schematic side elevations showing various stages in a flexible sub-assembly process of the present invention.

The preferred process begins with a first release sheet 500 (FIG. 10). A layer of an electro-optic medium 502 is coated or otherwise deposited upon the first release sheet 500. Separately, a layer of lamination adhesive 504 is formed on a second release sheet 506 and laminated to the electro-optic medium 502 so that the lamination adhesive 504 adheres to the electro-optic medium 502.

Figure 11:
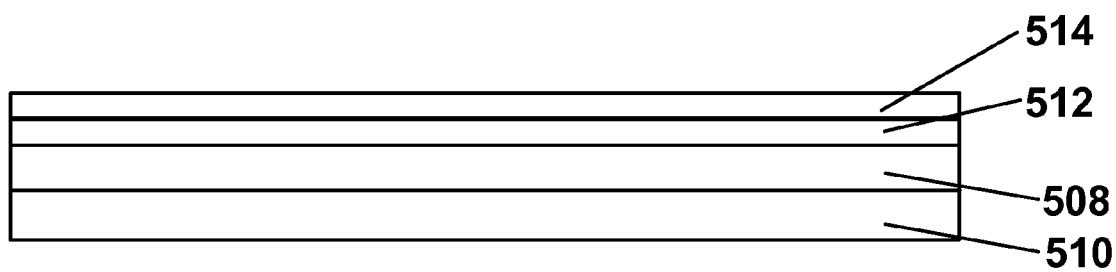
Figure 12:
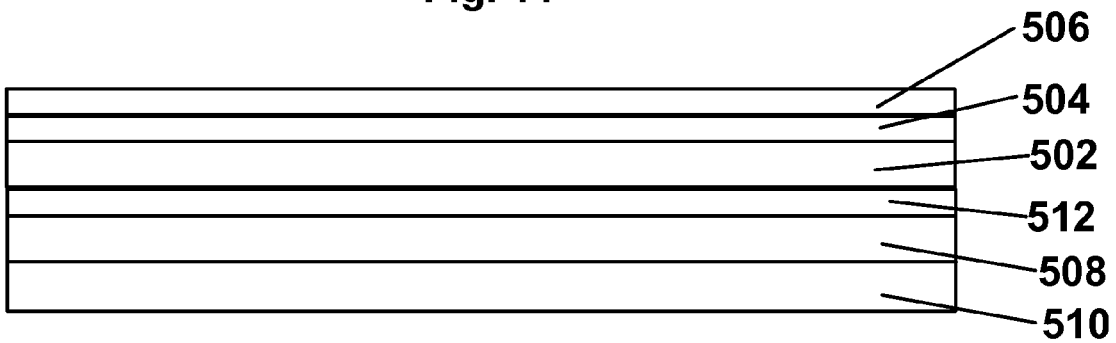

In a separate operation, as shown in FIG. 11, a backplane 508 is formed by screen printing or a similar deposition process (see the aforementioned E Ink/MIT patents and applications for appropriate processes for forming such a backplane) on a third release sheet 510. Separately, a layer of lamination adhesive 512 is formed on a fourth release sheet 514 and laminated to the backplane 508 so that the lamination adhesive 512 adheres to the backplane 508.

In the next step of the present process, the fourth release sheet 514 is removed from the structure shown in FIG. 11, thus exposing the lamination adhesive 512, and the first sheet 500 is removed from the structure shown in FIG. 10, thus exposing the electro-optic medium 502. The two resultant structures are them laminated together with the lamination adhesive 512 in contact with the electro-optic medium 502, thus forming the multi-layer structure shown in FIG. 12.

In a separate operation, another layer of lamination adhesive 516 is coated on a fifth release sheet 518. The third release sheet 510 is peeled from the structure shown in FIG. 12 and lamination adhesive 516 and the fifth release sheet 518 are laminated to the backplane surface thereof to produce the structure shown in FIG. 13.

Figure 13:
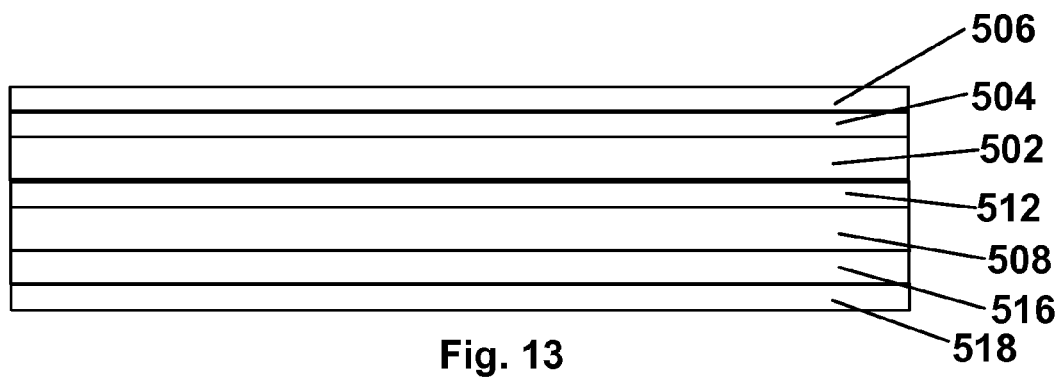
Figure 14:
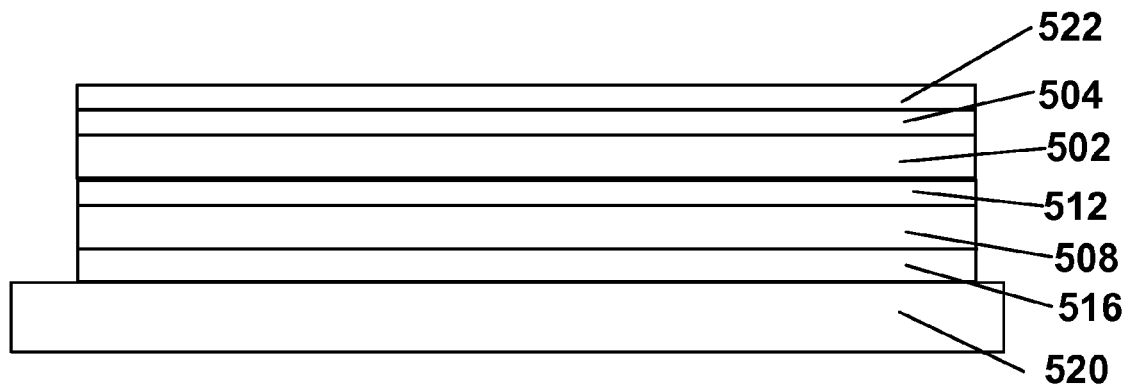

The next step of the process secures the structure of FIG. 13 to a substrate, for example a pressure sensitive switching or sensing device, which has been covered with a thin layer of dielectric material to isolate the electro-optic display components of the FIG. 13 structure. This lamination is effected by peeling the fifth release sheet 518 from the FIG. 13 structure and laminating the lamination adhesive 516 thus exposed to the substrate 520 (FIG. 14). Alternatively, this layer of lamination adhesive, which is in contact with the sensing or switching device, can be formed of a highly insulating pressure sensitive adhesive material, in which case it may be possible to eliminate the layer of dielectric material. Finally, the second release sheet 506 is removed to expose the lamination adhesive 504, which is then laminated to a top plane electrode 522, which will typically be supported on a front substrate, such as a polymeric film, which acts as a protective layer to protect the final electro-optic display. Alternatively, the top plane electrode 522 may be formed by a coating procedure, for example by depositing a conductive polymer on the lamination adhesive 504.

Various alternative processes may be used following the same basic pattern. For example, the electro-optic medium can be coated directly on a conductive support in the first step of the process, and hence the removal of the second release sheet and the lamination or formation of the top plane electrode omitted altogether. This procedure leads to a structure similar to that of FIG. 14, but without the topmost lamination adhesive layer. Alternatively, instead of peeling the first release sheet to expose the electro-optic medium, the second release sheet could be peeled instead, to yield a bilayer coating with the adhesive layer exposed. This bilayer coating can then be laminated to a conductive layer on a thin, plastic support. At this point, the first release sheet could be removed and the final steps of the process proceed as before. Other assembly variations can also be envisaged, so that the general method can be used to construct a variety of different electro-optic display structures and devices, in a variety of ways.

The construction techniques illustrated here specifically allow the preparation of at least two novel structures that comprise an electro-optic display device directly adhered to a mechanical sensor or transducer. The two novel structures differ in that in one, the top of the display device is protected by a protective sheet (typically a plastic film), whereas the second (wherein the top-plane electrode is applied as a conductive polymeric material, such as PEDOT) has no further protective layer. Which structure is preferred depends on the application, and the durability of the device that is required. In the case where the mechanical sensor is activated by buttons, those button faces in contact with the electro-optic device surface can be made smooth and/or somewhat compliant, so that a protective plastic layer may not be required. If the actuation of the sensor is to take place using a finger, or stylus or other sharp object (as in a touch screen application), the top protective layer will probably be required for durability. In either case, the durability of the device will be improved if the electro-optic medium is a polymer dispersed electrophoretic medium.

Other methods of applying electro-optic medium can also be used. In particular, electro-deposition of electrophoretic capsules and binder to a patterned backplane (U.S. Pat. No. 7,339,715) would be a particularly suitable method of incorporating the electro-optic medium, and would eliminate several of the lamination/delamination steps in the above procedure. This technique would also enable the use of multiple spot colors in addition to black or white as display enhancements.

From the foregoing, it will be seen that the flexible sub-assembly process of the present invention can provide an electro-optic display directly coupled to a mechanical transducer, and a general method for assembling this device using a series of lamination steps. The direct coupling between the display and the transducer eliminates the necessity for at least one relatively stiff support sheet, and improves the resolution and feel of the coupled device. One such device enabled by this invention is a touch screen for use with an encapsulated electrophoretic display; another is a telephone keypad with switchable button indicators. This is one use of a very powerful construction technique that can take advantage of the durability and flexibility of an encapsulated electrophoretic medium.

Apparatus for Displaying Color Images and Generating Pulses of Light

As already mentioned, the present invention provides apparatus for displaying color images, and apparatus for generating pulses of light of differing colors, the latter apparatus being intended for use as a sub-assembly in apparatus for displaying color images.

As noted above, it has been demonstrated that encapsulated electrophoretic and similar electro-optic media are compatible with color filter arrays. However, there are several fundamental challenges associated with integrating the color filter arrays, the electrophoretic or other electro-optic medium, and the drive electronics. The key issue associated with such a display design relates to the use of sub-pixels to form the pixels of the display. In this architecture, sub-pixels (for example red R, green G, and blue B) must be individually addressed in order to trick the human eye into seeing the spectrum of the basic colors. In other words, the smallest addressable element only shows a single color and shades thereof, i.e., a sub-pixel cannot show the entire spectrum of visible light. In a preferred embodiment, the smallest addressable element of the display can show each of the fundamental colors (R, G, and B in our example). The apparatus of the present invention addresses this problem using shutter-mode electro-optic media and a field sequential operating technique (i.e., a technique in which the "sub-images" representing the various color channels of the overall image are separated in time rather than in space, but in such a way that the eye of the observer sees the overall color image).

Figure 15:
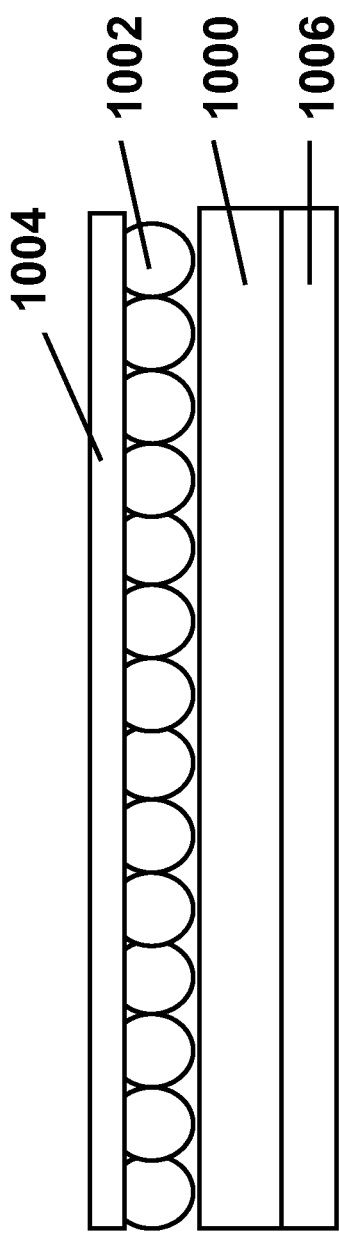
FIG. 15 is a schematic side elevation of an apparatus of the present invention for displaying color images.

There are two approaches to using field sequential addressing to eliminate the problem described above. First, using an apparatus of the invention for displaying a color image, one may use a color sequential backlight in the display (for example, the backlight manufactured by LumiLEDs Corporation, San Jose, Calif.), and employ a "shutter-mode" electro-optic optical transducer. The field sequential backlight flashes cyclically through the fundamental colors of the display, say red, green and blue, in synchronization with the shuttering speed of the optical transducer. By switching the optical transducer from clear to opaque with proper timing and spatial control, full color images may be presented to the viewer. This type of device is illustrated in a highly schematic manner in FIG. 15 of the accompanying drawings. FIG. 15 shows an electro-optic display comprising a substrate 1000 containing a plurality of pixel electrodes (not shown), a layer 1002 of electro-optic medium (illustrated as an encapsulated electrophoretic medium) and a continuous front electrode 1004. The display is provided with a field sequential backlight 1006 which flashes red, green and blue synchronized with the shuttering speed of the electro-optic medium layer 1002. The transducer and backlight should switch quickly enough so that the human eye temporally integrates the colors emitted by the display. Since gas-based electrophoretic media can have very high switching speeds, they may be preferred for use in this type of display.

Figure 16:
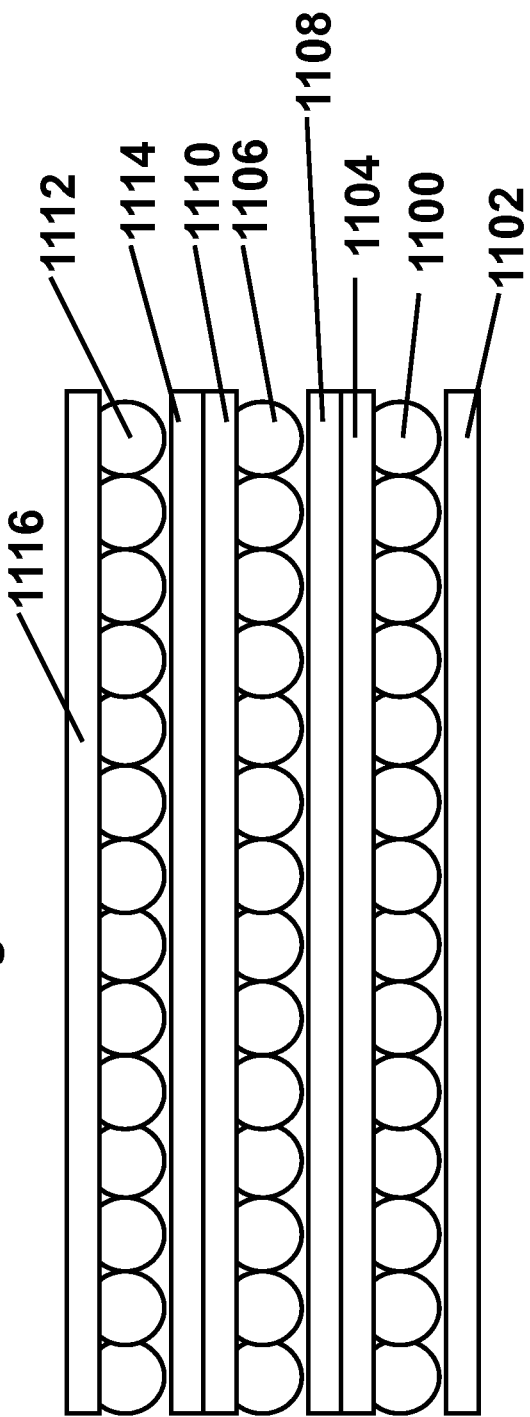
FIG. 16 is a schematic side elevation of an apparatus of the present invention for generating pulses of light of differing colors.

Secondly, a color sequential backlight (i.e., an apparatus of the invention for generating pulses of light of differing colors) may be constructed using stacked electro-optic films. These stacked electro-optic films, which are intended for use with a "monochrome" light modulator which may be of the electro-optic type as shown in FIG. 15) require only continuous electrodes, so they would have a low manufacturing cost. This type of device is illustrated in a highly schematic manner in FIG. 16 of the accompanying drawings. FIG. 16 shows a stacked color sequential back reflector comprising a blue shutter mode electro-optic medium layer 1100 (illustrated as an encapsulated electrophoretic medium) provided with continuous electrodes 1102 and 1104, a green shutter mode electro-optic medium layer 1106 provided with continuous electrodes 1108 and 1110, and a red shutter mode electro-optic medium layer 1112 provided with continuous electrodes 1114 and 1116. (It will be apparent to those skilled in the art that, by providing a voltage source capable of generating multiple drive voltages, one of each of the pairs of adjacent electrodes 1104/1108 and 1110/1114 may be eliminated.)

In a full color optical transducer such as that shown in FIG. 16, the electro-optic media films should be stacked to optimize their performance. For instance, if the transparent conductor used in the films is particularly absorbent to a portion of the visible spectrum, then that color should appear higher in the stack than the others. A shutter mode optical transducer, or any other optical transducer (liquid crystal, suspended particle displays, cholesteric liquid crystal, bistable nematic liquid crystal, etc.), may be used in conjunction with this apparatus as the monochrome optical transducer.

Although FIG. 16 illustrates the use of three stacked films, which is the most common arrangement (either red/green/blue or yellow/cyan/magenta), this invention is not restricted to the use of the three stacked films; in some cases, by careful selection of color ranges, it may be possible to generate useful color images using only two stacked films, or more may be used to improve the color gamut of the final images. Similarly, in the apparatus of the invention for displaying a color image, the lighting means will typically be arranged to flash separate pulses of three different colors, but a smaller or larger number of colors may be used.

This aspect of the present invention enables full color displays to be manufactured using shutter-mode electro-optic media, especially encapsulated electrophoretic media. The apparatus of the type shown in FIG. 15 allows very high color saturation and brightness, as the color sequential LED backlights provide impressive color gamut performance and light output. The stacked electrophoretic shutter-mode back apparatus of the type shown in FIG. 16 is a low power, potentially low cost design for an apparatus for generating pulses of light.

The apparatus shown in FIG. 15 in effect uses a variable transmission monochrome electro-optic medium to modulate colored flashes of light, thereby allowing formation of color images, whereas the apparatus shown in FIG. 16 uses stacked colored variable transmission electro-optic media to generate light of differing colors from a white light source. It will readily be apparent that the two types of apparatus can in a sense be combined by using stacked multi-pixel (as opposed to single pixel) colored variable transmission electro-optic media in the apparatus of FIG. 16, thereby enabling color (and preferably full color) images to be generated from a white light source. When using such stacked multi-pixel media, it is of course highly desirable to ensure that the pixels in the various stacked layers are aligned (i.e., that the electrodes defined similar pixels in each layer) to ensure good color rendition. Such color images can be static and hence in such an apparatus it is not necessary that the electro-optic media be able to switch rapidly. Although reference has been made to a white light source, it will be appreciated that this need not be a source of artificial light but could, for example, be a window or other source of natural light. Since stacked colored variable transmission media necessarily act in a subtractive mode, in general a combination of cyan, magenta and yellow media are desirable.

Processes and Components for Forming Electro-Optic Displays

As already mentioned, during the development of processes to laminate FPL's to glass active matrix backplanes (typically carrying thin film transistor arrays, or simply TFT's), numerous problems have been encountered with traditional lamination equipment. This invention provides modifications of conventional tooling that are required or desirable in order to facilitate the lamination of FPL's on glass TFT's. These modifications may also be useful in the design of lamination tools for FPL-based displays that use plastic or metal foil backplanes. The modifications can be conveniently divided into three main areas, namely temperature control of the lamination, placement of the FPL relative to the backplane, and design of the stage on which the lamination is effected, and these three areas are discussed separately below.

Temperature Control of Lamination

A conventional polarizer laminator useful for liquid crystal display (LCD) manufacturing is basically suitable for lamination of FPL's to backplanes, provided that the conventional machine is modified to include a system for heating of the parts to be laminated. There are preferred ways, some not readily apparent, however, in which to heat the parts to be laminated.

It is most desirable to apply heat in such a way that the lamination bond temperature is elevated sufficiently to cause plastic flow in the lamination adhesive (which is typically a polyurethane). There are many measures that may be used to describe plastic flow, which will be well-known to those skilled in this art. For present purposes, it may be stated that the bond line temperature should be equal to or higher than the temperature at which the lamination adhesive's bulk and shear moduli are equal (hereafter called the cross-over point). One may achieve this temperature level simply by heating the backplane to a temperature much higher than the cross-over point, and applying the FPL under pressure exerted through an unheated roller or mandrel.

In an improved process, one may also heat the roller or mandrel as well so that even more careful control of the bond line temperature may be realized. In another variant, the roller, the backplane, and the FPL itself may be heated to effect an even higher degree of control. In this last variant, pre-heating of the FPL allows for a considerable improvement of throughput, as the adhesive is pre-softened before entering the zone in which lamination takes place. In all embodiments, a thermally conductive plate (copper, aluminum, etc.) may be used to enhance thermal uniformity of the assorted heating elements.

Placement Control

A traditional polarizer laminator used in the LCD industry can position plastic films very precisely (0.2 mm to 0.3 mm placement accuracy is common for state-of-the-art machines) on glass substrates. When thermal lamination of FPL's is considered, however, it is found that the temperature of lamination cannot be so high that the FPL tends to slide during the lamination process. There are four primary parameters that affect FPL sliding:

1. lamination adhesive material choice;
2. lamination adhesive thickness;
3. lamination temperature, and
4. forces exerted on the FPL during lamination.

As an example, for the currently-preferred polyurethane lamination adhesive used at 18 μm thickness in an FPL, it is necessary for a glass backplane to be held at a temperature of less than 85° C. to prevent substantial sliding of the FPL on the glass during the lamination process (assuming normal tension on the FPL during the lamination process and the use of an unheated roller). For 15 μm thickness of adhesive, sliding is acceptable the temperature is less than 95° C. (for normal tension on the FPL during the process). Thus, the four parameters listed above should be controlled in order to prevent substantial sliding of the FPL during the lamination process. It is desirable for sliding to be less than 1 mm, more desirably less than 0.5 mm, and most desirably less than 0.3 mm.

Stage Design

This invention provides two improvements for the FPL support stage on an FPL lamination tool. The first improvement is thermal control of the support stage. This temperature control enables pre-heating of the FPL, and hence the adhesive on the FPL, which allows for greatly increased lamination speed. The heating may be accomplished by conductive, convective, or radiative heating. Heating of the FPL should of course not be so intense as to damage the FPL.

Secondly, the stage should be smoothed in such a way that it does not scratch the plastic surface of the FPL. The stage may be coated with or built from polytetrafluoroethylene (for example that sold under the Registered Trade Mark "TEFLON" by E.I. du Pont de Nemours & Co., Wilmington, Del.) or some similar soft, non-scratching plastic material. Alternatively, the stage may be built from metal and coated or anodized with non-scratching surfaces. Porous stone vacuum stages are available, but these stages may increase the tendency of the tool to scratch the FPL.

This invention also provides the following further improvements in the process for laminating an FPL to a backplane:

providing the ability to easily adjust the starting location for touchdown of a roller on to the FPL. (In conventional LCD-type equipment, a roller always touches down on the edge of the film, which is undesirable for FPL lamination. Simple adjustments to such a machine enable change of FPL starting position and length, but not roller starting position; providing such an adjustment is desirable.)

providing a heated roller to give better temperature uniformity and control, and eliminate the possibility of lamination bond-line temperature drift during a run.

various film stage modifications, including positioning vacuum holes to better match the final shape of the FPL; heating the stage (which can have secondary influence on ensuring uniform lamination temperature, although heating the roller is more important), and providing a flat surface on the stage to minimize scratching of the FPL.

Manufacturing Hybrid Displays

As already mentioned, the present invention provides several methods for manufacturing hybrid displays. This aspect of the invention revolves around a design methodology that enables the fabrication of hybrid displays, that is, displays built using front and back surfaces comprised of dissimilar materials. This aspect of the invention is applicable to all types of electro-optic displays.

As already indicated, manufacturing hybrid displays is extremely complicated because issues arise that are nearly non-existent in traditional display cell manufacture. The present invention provides methods and devices for manufacturing hybrid displays and includes the following:

1. paying constant attention to panel curvature resulting from CTE and CHE mismatch and using stress-releasing or reducing methods and devices to correct curvature;
2. carefully controlling environmental conditions during manufacture; and/or
3. producing an equilibrium, zero-stress curvature that matches the curvature demanded by the product chassis or frame.

In one embodiment of the invention, a curl-reducing method includes a creep mechanism. The hybrid display is heated to a temperature above a threshold. Then the panel temperature is lowered gradually, over an extended period of time in some cases, to release structural stresses that result from the differential expansion between panels of the display.

In another embodiment, a curl-reducing method includes reducing the curvature of a hybrid display by forcing the display to temporarily assume an opposite curvature and allowing the display to spring back. For example, the display may be pressed between a weight and a curved surface to force-compensate its innate curvature.

In a further embodiment, a third layer is adhered to the back side of the back panel to compensate the physical differences between the front panel laminate and the back panel that otherwise would lead to a greater degree of curvature. The extra third layer may be different from the back panel in any number of the following physical properties: CTE, CHE, Young's Modulus, and thickness.

In yet another embodiment, the front panel laminate and the back panel are adjusted to different temperatures such that when they are adhered to form the hybrid display, the curvature is reduced if not eliminated. At least one of the panels may be a web mobilized by a roller.

According to this aspect of the present invention, other aspects of the manufacturing process are also improved to reduce the risk of display curvature, e.g., in an edge-sealing process and framing process.

Figure 17:
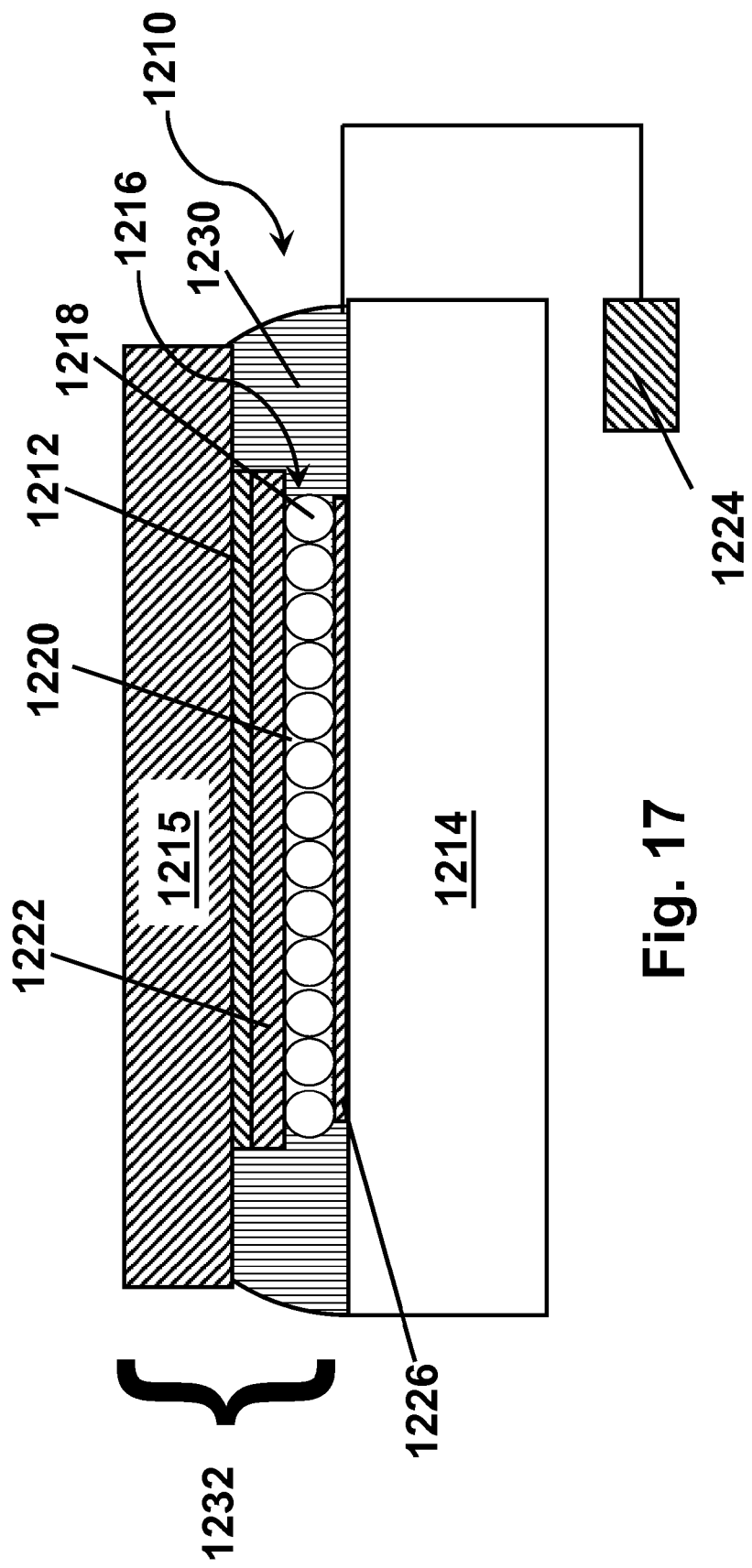
FIG. 17 is a schematic section through a display cell of an hybrid electrophoretic display which can be manufactured in accordance with the present invention.
Figure 20:
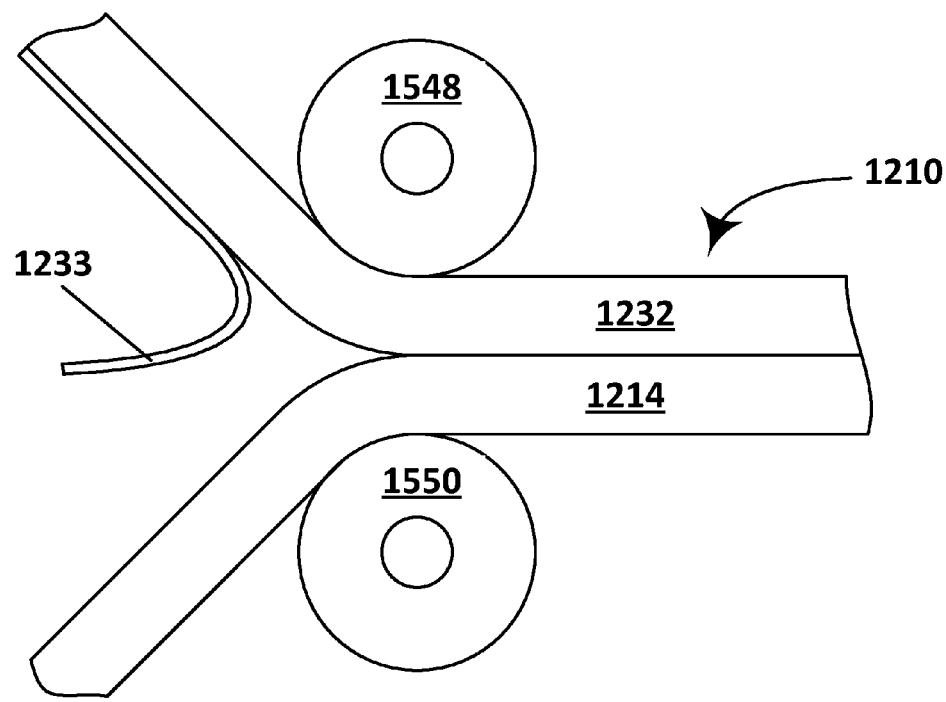
FIG. 20 illustrates a method of manufacturing a hybrid display in which temperature adjustment is used to control any tendency for the display to warp.

FIG. 17 illustrates an electrophoretic display cell (generally designated 1210), of the type shown in FIG. 20 of the aforementioned 2004/0027327 and manufactured using an FPL process. The display cell 1210 may be flexible, i.e., bendable or rollable without permanent deformation. In this construction, a front plane 1212 of the display 1210 is plastic and a backplane 1214 is formed of glass and provided with a TFT array. There may be a further protective layer 1215 over the front plane 1212. The protective layer 1215 may be a protective layer against ultraviolet radiation or a barrier against ingress of oxygen or moisture into the display 1210. Alternatively, the protective layer 1215 may offer extra resistance to impact, or may enhance certain optical effects, e.g., with an anti-reflective coating.

A layer 1216 of an electrophoretic medium lies between the front plane 1212 and the backplane 1214. The electrophoretic layer 1216 may include one or more capsules 1218 in a binder 1220 (the electrophoretic particles are omitted from FIG. 17 for clarity). A conductive layer 1222 acts as the common front electrode of the display 1210 and is disposed between the front plane 1212 and the electrophoretic layer 1216. In one embodiment, the conductive layer 1222 includes a thin, light-transmissive, and conductive material, e.g., ITO, aluminum oxide, or a conductive polymer. A circuit board 1224 is schematically shown to connect with the backplane 1214 for addressing the electrophoretic layer 1216 in conjunction with the conductive layer 1222.

An adhesive layer 1226 may be disposed between the electrophoretic layer 1216 and the backplane 1214. There may be further layers and parts in the display 1210 for various functions, e.g., a barrier film to further guard against external contaminants such as moisture, a contact pad for test-addressing the electrophoretic layer 1216, an auxiliary adhesive layer and so on. Some of those embodiments are described in more detail in the aforementioned 2004/0027327 and 2004/0155857. A seal 1230 may surround one or more edges of the display 1210. In one embodiment, as already described, the layers between and including the front plane 1212 and the adhesive layer 1226 are first manufactured as an FPL 1232, which is subsequently laminated to the backplane 1214. The protective layer 1215 may be considered part of the FPL if it is attached to the front plane 1212 before the FPL is laminated to the backplane 1214. For simplicity in illustration, the FPL 1232 is shown in the drawings as including the protective layer 1215. In one embodiment, a release sheet (not shown) is temporarily attached to the adhesive layer 1226 opposite the electrophoretic layer 1216 as manufacture of the FPL 1232 is completed. The release sheet is removed prior to laminating the FPL 1232 to the backplane 1214.

Examples of materials useful for making the front plane 1212 and/or the protective layer 1215 include heat stabilized poly(ethylene terephthalate) (e.g., Melinex grade 504, from Dupont Teijin Films, Wilmington, Del.) and high performance borosilicate glass (1737, from Corning Incorporated, Corning, N.Y.). In other embodiments, the PET film may be replaced by polyethylene naphthalate (PEN), polyethersulfone (PES), or other optically transparent or near-transparent films may be constructed without going beyond the scope of this invention.

Other display cell structures similar to that shown in FIG. 17 may be constructed without going beyond the scope of the invention. Other embodiments include encapsulated electrophoretic and similar electro-optic display cells that use:
1. a metal foil backplane the surface of which contains one or more active or non-active electronic circuits or devices,
2. a plastic foil backplane the surface of which contains one or more active or non-active electronic circuits or devices,
3. an FPL that includes a rigid or flexible color filter array on a surface between the electrophoretic medium and the viewer of the display, or
4. a plastic or glass substrate with active or non-active electronic circuits or devices and a color filter array (in which case the front panel laminate effectively becomes a back plane laminate).

Those skilled in the art of electronic display design and integration may readily identify other display architectures where the principles of the invention can be applied without going beyond the scope of the invention.

In the display cell shown in FIG. 17, there is a marked difference in mechanical properties between the materials that make up various layers of the display 1210, especially between the FPL 1232 and the backplane 1214. For instance, the heat stabilized PET material useful for making the FPL 1232 typically has a CTE about 18 ppm/° C. and a CHE about 7 ppm/% RH (relative humidity), while the glass making up the backplane 1214 has a CTE about 3.76 ppm/° C. and a CHE about 0 ppm/% RH. As a result of the differences in these properties, the display cell 1210 exhibits mechanical properties that are highly atypical. For instance, upon encounter with heat or moisture, the display panel 1210 will curl downward (into a "frown" in the side elevation of FIG. 17), and upon cooling or drying, the display panel 1210 will curl upward (into a "smile" in FIG. 17). This behavior is obviously undesirable in a finished product. Moreover, common lamination processes require elevated temperatures to attach the FPL 1232 to the glass/TFT backplane 1214. Therefore, without special measures, panel curl is almost guaranteed during hybrid display manufacture.

In order to eliminate or reduce the curling/warping phenomena, several methods and related devices are provided to eliminate or minimize the panel curl during and/or after manufacture. Various methods or aspects of these methods can be combined for purpose of practicing the present invention.

Referring back to FIG. 17, in a first method, part or the entire display panel 1210 is subjected to a thermal cycle in order to relieve the stresses associated with CTE and CHE mismatch at elevated temperatures used in lamination operations during the manufacture of the panel. In one embodiment, part or the entire display panel is heated past a threshold temperature, for example, 50° C., or 60° C. in a dry oven or heater for a first time period, e.g., 6-10 hours, after which the temperature is ramped downward over a second and possibly longer time period. The cooling/annealing process allows the polymeric binder 1216 that binds the encapsulated electrophoretic materials 1218 together, and the lamination adhesive that adheres the encapsulated electrophoretic material 1218 to the substrate layer, e.g., the conductive layer 1222, to release inherent stress through a creep mechanism. It is important to give the display cell 1210 suitable time at suitable temperature in order to adequately relax the system to a desired state. In one embodiment, the temperature in the second time period is lowered gradually, e.g., 1-2 degrees every hour, to the ambient temperature. The rate of temperature drop does not have to be constant, and can be varied.

Figure 18A:
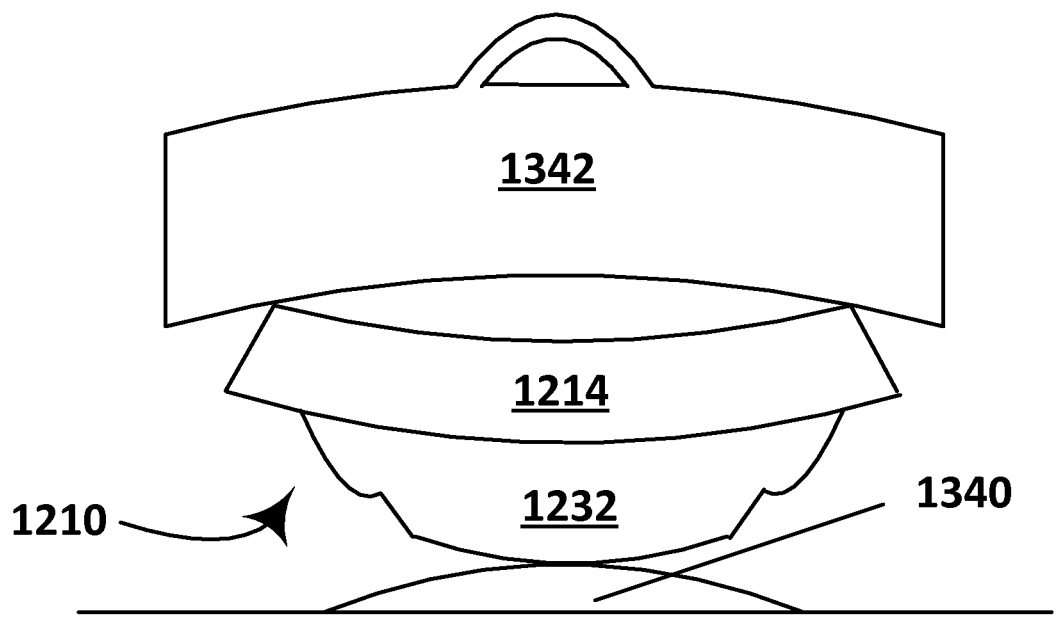
FIGS. 18A and 18B are schematic side elevations illustrating a method which may be used to relieve warping in a display such as that shown in FIG. 17.
Figure 18B:
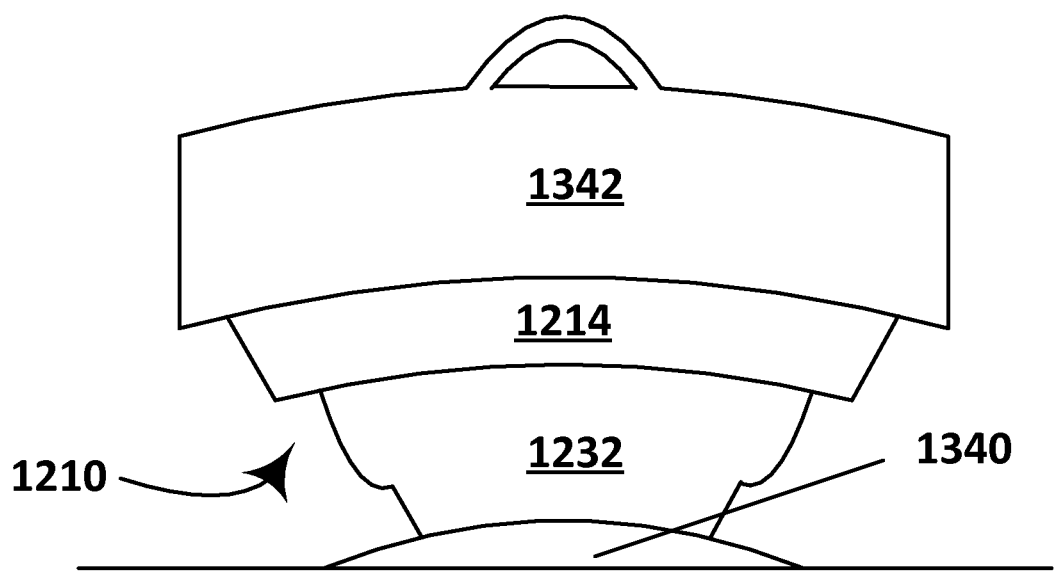

FIG. 18A illustrates a second method to relieve warping, a spring-back mechanism, which may be coupled with the creep mechanisms described above. The curled part of the display 1210 is temporarily placed on a curved corrective surface with a curvature that is opposite to that of the display 1210. The curvature of the corrective surface may be smooth. In one embodiment, the corrective surface simply constitutes a protrusion 1340 on a flat surface. The display cell 1210 is held against the corrective surface 1340, e.g., by a weight 1342 on the opposite side, possibly at an elevated temperature, e.g., 60° C. As shown in FIG. 18B, the display cell 1210 is forced to assume the curvature dictated by the protrusion 1340. After a suitable time which may range from minutes to days, the weight 1342 is removed, or the display panel 1210 is otherwise released. The display panel 1210 then springs back, in some cases, gradually, to the desired shape, i.e., flat or with a prescribed curvature. The spring-back process may also be temperature-controlled, for example, with the temperature gradually lowered from the previously-elevated temperature to the ambient temperature.

Figure 19:
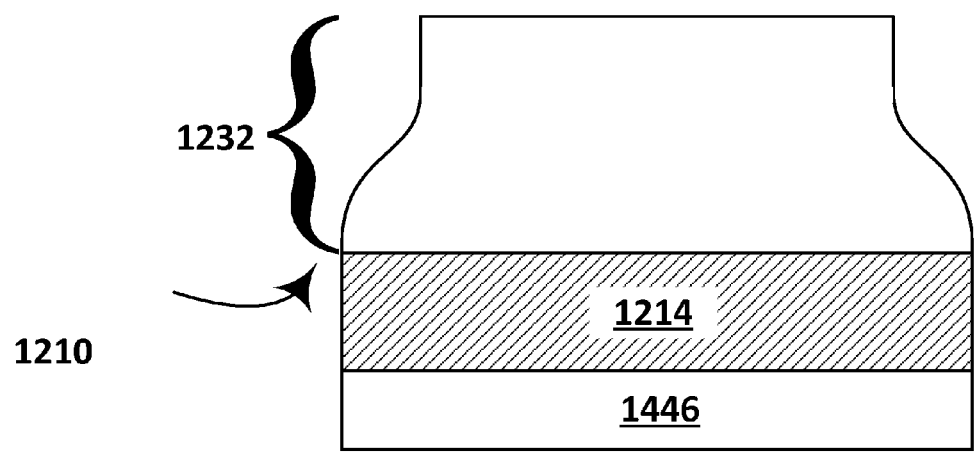
FIG. 19 is a schematic side elevation showing a further method which may be used to prevent warping in a display such as that shown in FIG. 17.

FIG. 19 illustrates a further method for preventing warping in a hybrid display such as that shown in FIG. 17. In this method, one or more layers 1446 of one or more materials dissimilar to the backplane 1214 are attached to the back side of the backplane 1214, and laminated with the rest of the display 1210 including the FPL 1232 as one final product. The material in the additional layer 1446 is selected with a particular CTE, CHE, Young's Modulus, or thickness so that during the lamination and ensuing processes, the display 1210 exhibits no or little warping. With the additional layer 1446, the display 1210 exhibits mostly axial expansion and contraction without much warping because it is mechanically a symmetric structure. The additional layer 1446 compensates for the differences in CTE, CHE, Young's Modulus, or thickness between the FPL 1232 and the backplane 1214, that otherwise would result in warping. In one embodiment, the additional layer 1446 is made of a material used in manufacturing the FPL 1232 such as heat stabilized PET, PEN, or PES.

FIG. 20 illustrates a further method for controlling warping by adjusting, i.e., by heating or cooling, the FPL 1232 and the backplane 1214 to different temperatures before, during and/or after the lamination process. In FIG. 20, a flex-on-flex architecture or roll-to-roll lamination process is shown as an example of this method. A web of FPL 1232, stripped of its release sheet 1233, is laminated to a web of backplane 1214 formed on a flexible substrate. The web of backplane 1214 may make use of transistors formed from polymeric semiconductors, as described in some of the aforementioned E Ink and MIT patents and published applications. Such a roll-to-roll lamination may be effected by passing the two webs through a nip between a pair of rollers 1548 and 1550 maintained at different temperatures. By passing quickly through rollers 1548 and 1550, the FPL 1232 and backplane 1214 are respectively heated or cooled to different average temperatures, causing differential expansion in the FPL 1232 and backplane 1214 before and/or during lamination. Following the roll-to-roll lamination process, the combined "display" web is cut to produce individual display cells 1210. Differential expansion can be set in a controlled manner to effect a desired change in the overall curl of the resulting display cell 1210.

Other lamination processes can also be used. For example, in a "piece-to-piece" process, in which individual cut pieces of FPL are laminated to individual backplanes, each piece of FPL can be pre-heated or cooled to a temperature different from that of the backplane. Other applicable lamination processes include the "web-to-piece" process where a continuous web of FPL, stripped of any release sheet, is laminated to a plurality of backplanes arranged in holders.

Because heating potentially leads to panel warping, other steps in the display manufacturing process that involve heating can also be modified by the present invention. Because encapsulated electrophoretic media are typically made using aqueous coating technology, the materials inherently attract water to some extent. When water is absorbed into the system, however, electrical properties of the materials may adversely change. To ensure reasonably uniform operation over a wide range of environmental conditions, it is necessary to seal the display to prevent moisture ingress, for example, through edge seal and front barrier film technologies disclosed the aforementioned 2004/0027327. In some of the sealing processes, heating is used and may contribute to panel warping.

Figure 21:
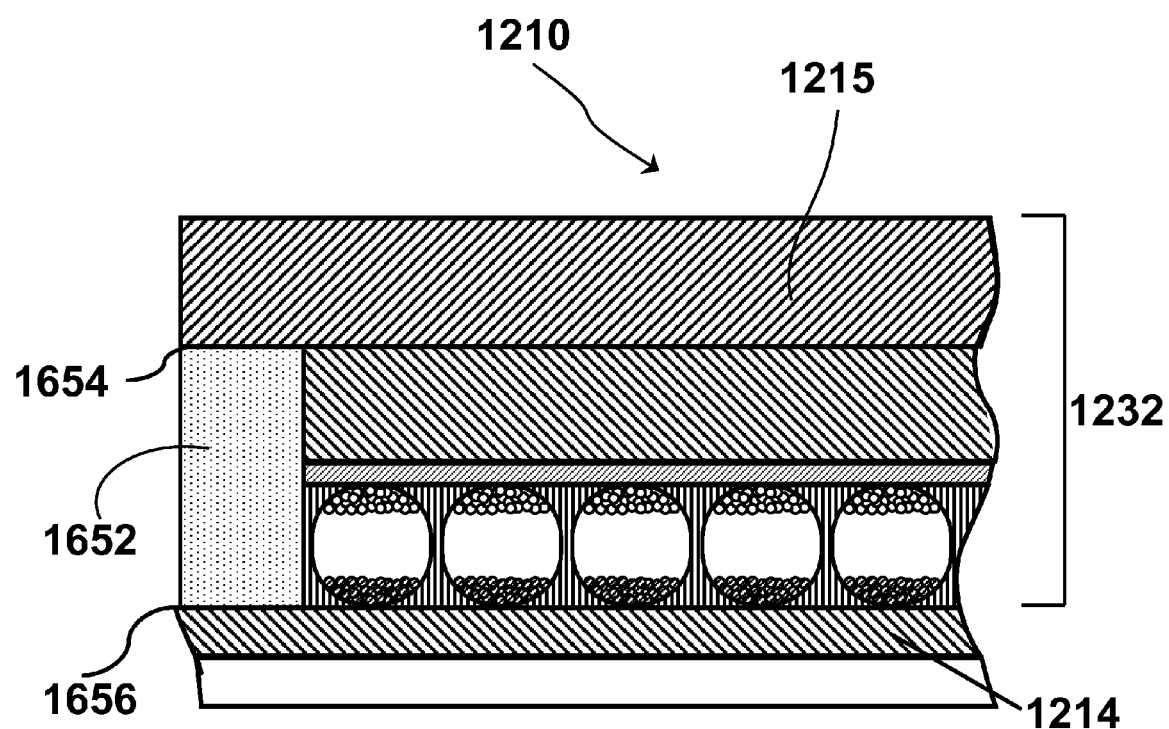
FIG. 21 is a schematic section, considerably enlarged as compared with FIG. 17, showing one possible edge seal geometry which may be used in the display of FIG. 17.

In one particular edge seal geometry illustrated in FIG. 21, a sealant 1652 is wicked into a thin cavity or gap around the periphery of the display cell 1210. The cavity top surface 1654 is formed by the overhang of the front protective sheet 1215 over the rest of the FPL 1232, and the cavity bottom surface 1656 is formed by the front surface of the backplane 1214. In one form of the display, the display panel 1210 is sealed using a liquid adhesive that is cured by ultra-violet radiation and/or heat. The liquid sealant 1652 containing the adhesive may be wicked into the cavity using surface tension forces, but these forces are slowed by the viscosity of the adhesive. For high manufacturing throughput, it is desirable to maximize the rate of wicking To do so, the following aspects of the sealing process may be controlled or improved by:

1. increasing the panel temperature to reduce adhesive viscosity;
2. increasing the temperature of the sealant dispenser head to reduce adhesive viscosity;
3. depositing a bead of adhesive that is sufficiently large to completely fill the cavity and also leave a fillet of adhesive just outside the cavity;
4. maximizing cavity height (which typically ranges between 100 µm and 300 µm);
5. ensuring that the adhesive substantially wets all materials that form the cavity;

6. making the cavity uniform in width around the periphery of the panel, especially at corners;
7. using a dispensing system with XY (in the plane of the panel) motion control and Z (height above the panel) adjustment;
8. using a dispensing system with XYθ motion control (θ degree of freedom adds the ability to swivel, for example, a dispensing needle bent with a right angle near the tip) and Z (height above the panel) adjustment; and/or
9. using a dispensing system capable of tracking edge features through machine vision and an appropriate software algorithm.

The edge seal may be formed by a capillary wicking process with the correct combination of cavity design, materials choices, and process controls. As an example, a thin cavity with nominal dimensions of 1.5 mm in width× 0.22 mm in height may be filled with UV curable adhesive (e.g. Nagase Chemtex Corporation model XNR-5516, Nagase & Co., Ltd., Tokyo, Japan). Rapid wicking can be achieved when the panel is held at an elevated temperature (e.g., 40° C. to 70° C.) in order to reduce the viscosity of the adhesive. It is also preferred to control the temperature of the panel during UV irradiation. As an example, the panel may be held at 40° C. while cured for 300 to 400 seconds at a UV dosage of 40 mW/cm2.

One of the most critical aspects of the sealing process described above involves heating the panel to reduce adhesive viscosity, which may cause stresses to develop in the display materials and result in warping. In order to minimize or reduce such warping effect, according to one method of the present invention, heating is limited to the periphery of the panel 1210 where the sealant 1652 is applied. This heating may be performed by radiative, conductive, or convective means. If bulk heating must be applied, then one of the other curl-relaxation methods of the present invention may be used, preferably before curing of the adhesive.

In some embodiments, the display panel 1210 will be fixed in a chassis or other frame in the final product to ensure that it presents a flat or uniformly curved surface to the viewer. Bending the display panel 1210 after the edge seal has been formed to conform the panel to the chassis or frame is undesirable because it superposes additional stress onto the laminates and edge seal. According to another aspect of the invention, a display panel is manufactured to have a "zero-stress," equilibrium curvature that matches or substantially matches the desired curvature of the finished and framed product within the range of common operating temperature and relative humidity. In one embodiment, the "zero-stress" equilibrium curvature is set at or near the midpoint of the operating environmental range.

For example, typical operating conditions for most electro-optic displays range from roughly 0° C. to 40° C. and 10% to 90% RH, but in some instances operation occurs over an even wider temperature and humidity range. Also, testing electro-optic displays usually includes a thermal shock test which subjects the display to cycles of exposure to very low and very high temperatures (e.g., −30° C. to +80° C.). For these wide temperature ranges, it is desirable to minimize stresses that will be experienced by the panel by setting the equilibrium curvature of the panel near the midpoint of the environmental range, e.g., around 20-25° C. in temperature and 40-60% RH.

One way to produce a display panel with a stress-free curvature is to select materials for the front and back panel with matching mechanical properties such as CTE and CHE. This design methodology can be used in display architectures other than the plastic-on-glass architecture discussed above, e.g., metal or plastic foil back planes, color filter array (CFA) on the front plane architectures, CFA on back plane architectures, and so on. For example, for a stainless steel foil back plane, the CTE is about 17 ppm/° C. and the CHE is about 0 ppm/% RH. In this case, curling will be dramatically reduced compared to the plastic-on-glass case, but it will likely be non-zero and some curl-reducing technique described above can be utilized. For plastic back plane displays, it is desirable to use identical materials for the FPL and the back plane. If this is impossible, and a CTE or CHE mismatch results, the same curl-reducing techniques described above may be used.

In displays which incorporate a color filter array (CFA), the challenges described herein are compounded by the need to align the CFA sub-pixels to the addressing elements on the back plane with precision. For a glass CFA on metal or plastic foil back plane, the CTE/CHE mismatch will result in behavior opposite to that described in the example above; heating or moisturizing results in a smile, cooling or drying results in a frown. Despite this opposite behavior, the same curl relaxation or reduction processes described above may be employed to reduce or eliminate curl in the system. However, in this architecture, it is preferred to use the edge seal to lock the FPL in the aligned state before undergoing the curl relaxation processes. If the edge seal is too compliant, the differential expansion and contraction of the front and backplanes will result in undesirable color shifts in the display as a function of temperature.

In a preferred embodiment, a flex CFA architecture is manufactured in which a flexible CFA is attached to a metal foil back plane with a CTE closely matched to that of the flexible CFA. For instance, the flexible CFA can be built on heat stabilized PET (CTE of about 18 ppm/° C., CHE of about 7 ppm/% RH) and the backplane can be built on stainless steel foil (CTE of about 17 ppm/° C., CHE of about 0 ppm/% RH). The front PET film can be isolated from moisture by using a front barrier film. Thin film options include SiO2, SOx, SiO, ITO, or other transparent ceramic barrier film, or polymeric materials such as Aclar™ (Honeywell International Corporation, Morristown, N.J.). Use of this barrier minimizes expansion and contraction of the PET due to CHE effects. With this type of packaging, it is possible to precisely align (accuracy to within a few microns) under controlled environmental conditions over sizable sheets (many tens of centimeters) of high resolution flex CFA (sub-pixel pitch of several hundred pixels per inch) to flexible active matrix back planes. Of course, lower resolution embodiments may be readily constructed by those skilled in the art.

In another embodiment, the colored patterns of the CFA are built directly below or directly above the TFT on a single glass substrate and the display is viewed through the TFT and the color filter. Advantageously, this construction does not require any alignment.

In a preferred embodiment, however, the electro-optic layer is attached to the TFT/CFA using a "double release film" as described above and in the aforementioned 2004/0155857. According to this approach, the electro-optic layer or film is coated to a release material and then transferred from that release material to the TFT/CFA. The double release approach attaches the front surface of the electro-optic layer to the TFT/CFA using a thin film of adhesive, and attaches the resultant structure to the backplane using a second layer of lamination adhesive. The double release approach offers two fundamental advantages, namely that the front surface of the electro-optic layer offers better optics as compared with the alternative approach wherein the lamination adhesive faces the observer, and also that since there is only a thin adhesive on the side closest to the TFT, the resolution of the display is improved due to reduced cross-talk among pixels.

Except as specifically noted above, the preferred materials for producing electrophoretic and other electro-optic media, and the preferred processes for forming such media, for use in the present invention are the same as in similar prior art media, and for an extensive discussion of such preferred materials and processes for use in producing encapsulated electrophoretic media, the reader is referred to the aforementioned E Ink and MIT patents and applications.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

The invention claimed is:

1. A process for producing an assembly useful in the production of an encapsulated electrophoretic display, the process comprising:
   providing an electrophoretic medium comprising a plurality of discrete droplets in a polymeric binder, each droplet comprising a plurality of charged particles dispersed in a suspending fluid and capable of moving therethrough on application of an electric field to the suspending fluid;
   providing a front sub-assembly comprising a light-transmissive electrically-conductive layer and a color filter array; and
   laminating the electrophoretic medium to the front-assembly at a temperature at which the polymeric binder will flow, thereby causing the polymeric binder to flow and secure the electrophoretic medium to the front sub-assembly to form the assembly, with the light-transmissive electrically-conductive layer disposed between the color filter array and the electrophoretic medium.

2. A process according to claim 1 wherein each droplet is confined within a capsule wall separate from the polymeric binder.

3. A process according to claim 1 wherein the droplets form the discontinuous phase of a two-phase system and are surrounded by a continuous phase forming the polymeric binder.

4. A process according to claim 1 wherein the electrophoretic medium is provided with a release sheet covering its surface which will be laminated to the front sub-assembly, and the release sheet is removed prior to the lamination.

5. A process according to claim 1 further comprising laminating the assembly to a backplane comprising at least one electrode, thereby causing the polymeric binder to flow and secure the electrophoretic medium to the backplane.

6. A process according to claim 5 wherein the electrophoretic medium is provided with a release sheet covering its surface which is to be laminated to the backplane, and the release sheet is removed prior to the lamination.

7. A process according to claim 1 wherein the polymeric binder flows at a temperature of not more than about 150° C.

8. A process according to claim 7 wherein the polymeric binder flows at a temperature of not more than about 100° C.

9. A process according to claim 1 wherein the polymeric binder comprises from about 33 to about 67 percent of the electrophoretic layer.

10. A process according to claim 1 wherein, after the lamination, the polymeric binder is cured so that it no longer flows at a temperature of about 150° C.

11. A process according to claim 1 wherein the polymeric binder comprises a polyurethane.

12. A process according to claim 5 wherein the backplane is an active matrix backplane comprising a plurality of pixel electrodes and at least one non-linear element associated with each pixel electrode.

13. An article of manufacture comprising, in order: a color filter array; a light-transmissive electrically-conductive layer; an electrophoretic medium comprising a plurality of discrete droplets of electrophoretic medium in a polymeric binder, each droplet comprising a plurality of charged particles dispersed in a suspending fluid and capable of moving therethrough on application of an electric field to the suspending fluid, the polymeric binder flowing at a temperature of not more than about 150° C.; and a release sheet in contact with the polymeric binder.

14. A method for manufacturing a hybrid display, the method comprising: (a) providing a front plane laminate comprising an electro-optic layer and a substrate, the front plane laminate having a first coefficient of thermal expansion (CTE); (b) producing an electro-optic display by laminating the front plane laminate to a backplane comprising at least one electrode, the backplane having a second CTE; (c) heating the display to a temperature above a threshold temperature, thereby producing a heated display with a curvature; and (d) gradually lowering the temperature to an ambient temperature to release structural stress resulting from any differential expansion of the front plane laminate and the backplane such that the curvature is substantially reduced.

* * * * *